United States Patent
Fan et al.

(10) Patent No.: US 12,028,889 B2
(45) Date of Patent: Jul. 2, 2024

(54) COMMUNICATION METHOD AND COMMUNICATION APPARATUS TO IMPROVE FLEXIBILITY OF UNICAST COMMUNICATION

(71) Applicant: Huawei Technologies Co., Ltd., Shenzhen (CN)

(72) Inventors: Qiang Fan, Hefei (CN); Wenjie Peng, Shanghai (CN); Dongdong Wei, Shanghai (CN); Jun Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/376,833

(22) Filed: Jul. 15, 2021

(65) Prior Publication Data
US 2021/0345356 A1 Nov. 4, 2021

Related U.S. Application Data

(63) Continuation of application No. PCT/CN2020/070088, filed on Jan. 2, 2020.

(30) Foreign Application Priority Data

Jan. 16, 2019 (CN) .......................... 201910041462.0

(51) Int. Cl.
*H04W 72/08* (2009.01)
*H04W 72/543* (2023.01)
(Continued)

(52) U.S. Cl.
CPC .......... *H04W 72/543* (2023.01); *H04W 76/11* (2018.02); *H04W 76/14* (2018.02)

(58) Field of Classification Search
CPC ... H04W 72/543; H04W 76/14; H04W 76/11; H04W 72/56; H04W 8/005; H04W 84/18;
(Continued)

(56) References Cited

U.S. PATENT DOCUMENTS

2017/0215183 A1  7/2017  Gulati et al.
2018/0132304 A1  5/2018  Lee et al.
(Continued)

FOREIGN PATENT DOCUMENTS

CN    106470384 A    3/2017
CN    108923894 A    11/2018
(Continued)

OTHER PUBLICATIONS

"On NR sidelink radio bearer") Nov. 12, 2018 (Year: 2018).*
(Continued)

*Primary Examiner* — Mewale A Ambaye
(74) *Attorney, Agent, or Firm* — Slater Matsil, LLP

(57) ABSTRACT

A communication method includes: a first communication apparatus obtains first configuration information and sends the first configuration information to a second communication apparatus, where the first configuration information includes configuration information of a first sidelink radio bearer which is used to carry a first unicast service between the first communication apparatus and the second communication apparatus, and the first sidelink is a radio link between the first communication apparatus and the second communication apparatus.

10 Claims, 13 Drawing Sheets

(51) Int. Cl.
*H04W 76/11* (2018.01)
*H04W 76/14* (2018.01)

(58) Field of Classification Search
CPC ....... H04W 88/04; H04W 8/26; H04W 72/04; H04W 76/23; H04W 92/18
See application file for complete search history.

(56) References Cited

U.S. PATENT DOCUMENTS

| | | | |
|---|---|---|---|
| 2018/0343692 A1 | 11/2018 | Lee et al. | |
| 2020/0267790 A1* | 8/2020 | Kim | H04W 76/14 |
| 2022/0312318 A1* | 9/2022 | Babaei | H04L 5/0055 |
| 2023/0171633 A1* | 6/2023 | Babaei | H04W 4/06 |
| | | | 370/252 |

FOREIGN PATENT DOCUMENTS

| | | |
|---|---|---|
| WO | 2018080566 A1 | 5/2018 |
| WO | WO-2018080566 A1 * | 5/2018 |

OTHER PUBLICATIONS

"Radio bearer configuration and management for NR sidelink") Nov. 12, 2018 (Year: 2018).*

Huawei, HiSilicon, "Potential AS layer impacts on SL connection setup and configuration in unicast", 3GPP TSG-RAN WG2 # 104, R2-1816517, Nov. 12-16, 2018, 4 pages, Spokane, USA.

3GPP TS 38.331 V15.4.0, 3rd Generation Partnership Project, Technical Specification Group Radio Access Network, NR, Radio Resource Control (RRC) protocol specification (Release 15), (Dec. 2018), 474 pages.

3GPP TS 23.285 V15.2.0 , 3rd Generation Partnership Project, Technical Specification Group Services and System Aspects, Architecture enhancements for V2X services (Release 15), (Dec. 2018), 37 pages.

ZTE, Sanechips, "Consideration on QoS management for NR V2X", 3GPP TSG-RAN WG2 #104, R2-1816988, Nov. 12-16, 2018, 4 pages, Spokane, USA.

3GPP TR 23.786 V1.0.0, 3rd Generation Partnership Project, Technical Specification Group Services and System Aspects, Study on architecture enhancements for EPS and 5G System to support advanced V2X services (Release 16), (Dec. 2018), 109 pages.

3GPP TS 24.334 V15.2.0, 3rd Generation Partnership Project, Technical Specification Group Core Network and Terminals, Proximity-services (ProSe) User Equipment (UE) to ProSe function protocol aspects, Stage 3 (Release 15), (Sep. 2018), 264 pages.

3GPP TS 23.303 V15.1.0, 3rd Generation Partnership Project, Technical Specification Group Services and System Aspects, Proximity-based services (ProSe), Stage 2 (Release 15), (Jun. 2018), 130 pages.

Huawei et al., "Radio bearer configuration and management for NR sidelink", 3GPP TSG-RAN WG2 Meeting #104, R2-1816522, Nov. 12-16, 2018, 5 pages, Spokane, USA.

Huawei et al., "Potential AS layer impacts on SL connection setup and configuration in unicast", 3GPP TSG-RAN WG2 Meeting #104, R2-1816517, Nov. 12-16, 2018 , 4 pages, Spokane, USA.

Ericsson, "On NR sidelink radio bearer", GPP TSG-RAN WG2 Meeting #104, R2-1817926, Nov. 12-16, 2018 , 3 pages, Spokane, WA, USA.

"Report of [103bis#38] SL unicast/groupcast (LG)," Agenda Item: 11.4.2.3, Source: LG (rapporteur), Document for: Discussion and Decision, 3GPP TSG-RAN WG2 #104, R2-1818496, Spokane, USA, Nov. 12-16, 2018, 20 pages.

* cited by examiner

Communication apparatus 7000

Obtaining module 7001

Transceiver module 7002

FIG. 16

Communication apparatus 8000

Transceiver 8001

Processor 8002

FIG. 17

COMMUNICATION METHOD AND COMMUNICATION APPARATUS TO IMPROVE FLEXIBILITY OF UNICAST COMMUNICATION

CROSS-REFERENCE TO RELATED APPLICATIONS

This application is a continuation of International Application No. PCT/CN2020/070088, filed on Jan. 2, 2020, which claims priority to Chinese Patent Application No. 201910041462.0, filed on Jan. 16, 2019. The disclosures of the aforementioned applications are herein incorporated by reference in their entireties.

TECHNICAL FIELD

This application relates to the field of communication technologies, and more specifically, to a communication method and a communication apparatus.

BACKGROUND

When sidelink communication is performed between terminal devices, data of a unicast service may be transmitted between two terminal devices in a unicast communication manner. In a conventional solution, a sidelink radio bearer is usually configured in a process of establishing a unicast connection. The configuration of the sidelink radio bearer is usually predefined, and then unicast communication is performed based on the sidelink radio bearer. A disadvantage of this communication method is that flexibility is not high.

SUMMARY

This application provides a communication method and a communication apparatus, to improve flexibility of unicast communication.

According to a first aspect, a communication method is provided. The method includes: A first communication apparatus obtains first configuration information; and the first communication apparatus sends the first configuration information to a second communication apparatus.

The first configuration information includes configuration information of a first sidelink radio bearer, the first sidelink radio bearer is used to carry a first unicast service between the first communication apparatus and the second communication apparatus, and a first sidelink is a radio link between the first communication apparatus and the second communication apparatus.

The first sidelink bearer may include a sidelink data radio bearer (SL-DRB), a sidelink signaling radio bearer (SL-SRB), and the like. In other words, the first sidelink bearer may include only the SL-DRB, or may include only the SL-SRB, or may include both the SL-DRB and the SL-SRB.

Optionally, configuration information of the SL-DRB includes one or more of the following information: information about a relationship of mapping a quality of service QoS flow to the SL-DRB, packet data convergence protocol PDCP configuration information, radio link control RLC layer configuration information, and logical channel LCH configuration information.

Optionally, the first sidelink radio bearer is a radio bearer that can satisfy a service requirement corresponding to QoS information of the first unicast service.

When the first sidelink radio bearer is the radio bearer that can satisfy the service requirement corresponding to the QoS information of the first unicast service, the first configuration information is exchanged between the first communication apparatus and the second communication apparatus, so that the first communication apparatus and the second communication apparatus can perform the first unicast service based on the first configuration information, thereby satisfying the service requirement of the first unicast service.

Optionally, that a first communication apparatus obtains first configuration information includes: The first communication apparatus determines the first configuration information based on the QoS information of the first unicast service.

In this application, configuration information of a sidelink radio bearer that carries a unicast service is exchanged between communication apparatuses, so that data of the unicast service can be better transmitted between the communication apparatuses based on the configuration information of the sidelink radio bearer.

With reference to the first aspect, in some implementations of the first aspect, when a unicast connection exists between the first communication apparatus and the second communication apparatus, and a sidelink radio bearer of the existing unicast connection between the first communication apparatus and the second communication apparatus does not satisfy the service requirement corresponding to the QoS information of the first unicast service, the first communication apparatus sends the first configuration information to the second communication apparatus.

The service requirement corresponding to the QoS information of the first unicast service may also be referred to as a service requirement of the first unicast service.

That a sidelink radio bearer of the existing unicast connection between the first communication apparatus and the second communication apparatus does not satisfy the service requirement corresponding to the QoS information of the first unicast service may mean that when the service data of the first unicast service is transmitted by using the sidelink radio bearer of the existing unicast connection, the service requirement corresponding to the QoS information of the first unicast service cannot be satisfied.

Optionally, when the sidelink radio bearer of the existing unicast connection does not satisfy the service requirement corresponding to the QoS information of the first unicast service, the method further includes: The first communication apparatus updates a configuration parameter of the sidelink radio bearer of the existing unicast connection based on the first configuration information.

In this embodiment of this application, when the sidelink radio bearer of the existing unicast connection does not satisfy the service requirement corresponding to the QoS information of the first unicast service, the first configuration information is exchanged between the communication apparatuses, so that the first communication apparatus and the second communication apparatus can update the configuration of the sidelink radio bearer of the existing unicast connection based on the first configuration information. Therefore, when the first unicast service is subsequently performed, the service requirement corresponding to the QoS information of the first unicast service can be satisfied.

Optionally, the method may further include: The first communication apparatus determines whether a unicast connection exists between the first communication apparatus and the second communication apparatus. When the unicast connection exists between the first communication apparatus and the second communication apparatus, the first communication apparatus determines whether a sidelink radio bearer of the existing unicast connection satisfies the service requirement corresponding to the QoS information of the first unicast service.

Whether the sidelink radio bearer of the existing unicast connection satisfies the service requirement corresponding to the QoS information of the first unicast service may be performed based on a mapping that is from a QoS flow to an SL-DRB and that is included in a configuration of the unicast connection.

For example, when the QoS information of the first unicast service is included in existing QoS flow information, it is determined that the sidelink radio bearer of the existing unicast connection can satisfy the service requirement corresponding to the QoS information of the first unicast service. However, when the QoS information of the first unicast service is not included in existing QoS flow information, it is determined that the sidelink radio bearer of the existing unicast connection cannot satisfy the service requirement corresponding to the QoS information of the first unicast service.

With reference to the first aspect, in some implementations of the first aspect, the method may further include: A non-access stratum of the first communication apparatus indicates first information to an access stratum of the first communication apparatus; and the access stratum of the first communication apparatus determines, based on the first information, that the sidelink radio bearer of the existing unicast connection does not satisfy the service requirement corresponding to the QoS information of the first unicast service.

For example, the first information includes the QoS information of the first unicast service, or the first information includes the QoS information of the first unicast service and identifier information of the second communication apparatus.

In this embodiment of this application, through interaction between the non-access stratum of the first communication apparatus and the access stratum of the first communication apparatus, the access stratum of the first communication apparatus can obtain the first information related to the first unicast service, to further determine, based on the first information, whether the sidelink radio bearer of the existing unicast connection can satisfy the service requirement corresponding to the QoS information of the first unicast service.

It should be understood that, when the non-access stratum of the first communication apparatus indicates the first information to the access stratum of the first communication apparatus, the first information may be indicated in an explicit manner, or the first information may be indicated in an implicit manner.

With reference to the first aspect, in some implementations of the first aspect, no unicast connection exists currently between the first communication apparatus and the second communication apparatus, and that a first communication apparatus obtains first configuration information specifically includes: A non-access stratum of the first communication apparatus obtains the first configuration information from an access stratum of the first communication apparatus; and that the first communication apparatus sends the first configuration information to the second communication apparatus specifically includes: The non-access stratum of the first communication apparatus sends a first request message to a non-access stratum of the second communication apparatus, to establish a first unicast connection between the first communication apparatus and the second communication apparatus.

For example, the first request message includes the first configuration information, and the first unicast connection is used to transmit the service data of the first unicast service between the first communication apparatus and the second communication apparatus.

When no unicast connection exists between the communication apparatuses, the non-access stratum of the first communication apparatus can obtain the first configuration information by interacting with the access stratum of the first communication apparatus, then generate the first request message based on the first configuration information, and transmit the first configuration information to the second communication apparatus in a process of sending the first request message to the second communication apparatus.

With reference to the first aspect, in some implementations of the first aspect, (optionally) before the non-access stratum of the first communication apparatus obtains the first configuration information from the access stratum of the first communication apparatus (optionally), the method further includes: The non-access stratum of the first communication apparatus indicates any one or more of the following information to the access stratum of the first communication apparatus: unicast type indication information, identifier information of the first communication apparatus, identifier information of the second communication apparatus, or the QoS information of the first unicast service.

(Optionally) Before obtaining the first configuration information from the access stratum of the first communication apparatus, the non-access stratum of the first communication apparatus indicates the foregoing information to the access stratum of the first communication apparatus, so that the non-access stratum of the first communication apparatus obtains the first configuration information from the access stratum of the first communication apparatus. For example, after the non-access stratum of the first communication apparatus indicates the foregoing information to the access stratum of the first communication apparatus, the access stratum of the first communication apparatus may feed back or send the first configuration information to the non-access stratum of the first communication apparatus (the non-access stratum of the first communication apparatus indicates the information to the access stratum of the first communication apparatus, so that the access stratum of the first communication apparatus can be triggered to feed back the first configuration information to the non-access stratum of the first communication apparatus).

With reference to the first aspect, in some implementations of the first aspect, no unicast connection exists currently between the first communication apparatus and the second communication apparatus, and the method further includes: A non-access stratum of the first communication apparatus sends a second request message to a non-access stratum of the second communication apparatus, to establish a second unicast connection between the first communication apparatus and the second communication apparatus, where the second unicast connection is used to transmit the service data of the first unicast service between the first communication apparatus and the second communication apparatus; and that the first communication apparatus sends the first configuration information to the second communication apparatus includes: An access stratum of the first communication apparatus sends the first configuration information to an access stratum of the second communication apparatus.

In this embodiment of this application, when no unicast connection exists between the communication apparatuses, the second unicast connection is first established between the first communication apparatus and the second communication apparatus, so that the access stratum of the second communication apparatus subsequently sends the first configuration information to the access stratum of the first communication apparatus based on the second unicast connection.

With reference to the first aspect, in some implementations of the first aspect, (optionally) before the access stratum of the first communication apparatus sends the first configuration information to the access stratum of the second communication apparatus, the method further includes: The non-access stratum of the first communication apparatus indicates any one or more of the following information to the access stratum of the first communication apparatus: unicast type indication information, identifier information of the first communication apparatus, identifier information of the second communication apparatus, or the QoS information of the first unicast service.

In this embodiment of this application, the non-access stratum of the first communication apparatus indicates the foregoing information to the access stratum of the first communication apparatus, so that the access stratum of the first communication apparatus can be triggered to send the first configuration information to the access stratum of the second communication apparatus.

With reference to the first aspect, in some implementations of the first aspect, the method further includes: The first communication apparatus sends a third request message to a radio access network device; and the first communication apparatus receives the first configuration information sent by the radio access network device.

For example, the third request message includes the QoS information of the first unicast service, or the third request message includes the QoS information of the first unicast service and a unicast connection identifier of the unicast connection corresponding to the first unicast service.

In the foregoing manner of obtaining the first configuration information by interacting with the access network device, it is convenient for the access network device to control the configuration information.

With reference to the first aspect, in some implementations of the first aspect, the identifier information of the first communication apparatus is updated, and the method further includes: The first communication apparatus sends identifier update information to the second communication apparatus, where the identifier update information is used to indicate updated identifier information of the first communication apparatus.

In this embodiment of this application, the identifier update information is sent to the second communication apparatus, so that when the first communication apparatus and the second communication apparatus perform unicast communication, corresponding unicast communication service data can be normally transmitted between the first communication apparatus and the second communication apparatus.

With reference to the first aspect, in some implementations of the first aspect, the non-access stratum of the first communication apparatus is a PC5 signaling layer or an internet of vehicles V2X layer of the first communication apparatus, and the access stratum of the first communication apparatus is a radio resource control RRC layer or a sidelink radio resource control SL RRC layer of the first communication apparatus.

According to a second aspect, a communication method is provided. The method includes: A second communication apparatus receives first configuration information sent by a first communication apparatus; and the second communication apparatus determines configuration information of a first sidelink radio bearer based on the first configuration information.

The first configuration information includes the configuration information of the first sidelink radio bearer, the first sidelink radio bearer is used to carry a first unicast service between the first communication apparatus and the second communication apparatus, and a first sidelink is a radio link between the first communication apparatus and the second communication apparatus.

In this embodiment of this application, configuration information of a sidelink radio bearer that carries a unicast service is exchanged between communication apparatuses, so that data of the unicast service can be better transmitted between the communication apparatuses based on the configuration information of the sidelink radio bearer.

With reference to the second aspect, in some implementations of the second aspect, no unicast connection exists currently between the first communication apparatus and the second communication apparatus, and that a second communication apparatus receives first configuration information sent by a first communication apparatus specifically includes:

A non-access stratum of the second communication apparatus receives a first request message sent by a non-access stratum of the first communication apparatus, to establish a first unicast connection between the first communication apparatus and the second communication apparatus.

The first request message includes the first configuration information, and the first unicast connection is used to transmit the service data of the first unicast service between the first communication apparatus and the second communication apparatus.

With reference to the second aspect, in some implementations of the second aspect, no unicast connection exists currently between the first communication apparatus and the second communication apparatus, and the method further includes: A non-access stratum of the second communication apparatus receives a second request message sent by a non-access stratum of the first communication apparatus, to establish a second unicast connection between the first communication apparatus and the second communication apparatus; and that a second communication apparatus receives first configuration information sent by a first communication apparatus specifically includes: An access stratum of the second communication apparatus receives the first configuration information sent by an access stratum of the first communication apparatus.

The second request message is used to transmit the service data of the first unicast service between the first communication apparatus and the second communication apparatus.

With reference to the second aspect, in some implementations of the second aspect, the method further includes: The second communication apparatus receives identifier update information sent by the first communication apparatus, where the identifier update information is used to indicate updated identifier information of the first communication apparatus.

According to a third aspect, a communication method is provided. The method includes: A first communication apparatus obtains identifier update information, where the identifier update information includes updated identifier information of the first communication apparatus; and the first communication apparatus sends the identifier update information to a second communication apparatus through a sidelink, where the sidelink is a radio link between the first communication apparatus and the second communication apparatus.

In this embodiment of this application, the identifier update information is sent to the second communication apparatus, so that when the first communication apparatus and the second communication apparatus perform unicast communication, corresponding unicast communication service data can be normally transmitted between the first communication apparatus and the second communication apparatus.

With reference to the third aspect, in some implementations of the third aspect, the identifier update information further includes identifier information that is of the first communication apparatus and that is not updated.

The identifier information that is of the first communication apparatus and that is not updated is retained in the identifier update information, so that it can be ensured that unicast communication service data transmitted between the first communication apparatus and the second communication apparatus before the identifier update can also be normally transmitted between the first communication apparatus and the second communication apparatus.

With reference to the third aspect, in some implementations of the third aspect, the identifier information of the first communication apparatus includes an application layer identifier of the first communication apparatus and/or a source layer 2 identifier of the first communication apparatus.

According to a fourth aspect, a communication apparatus is provided. The apparatus may be a terminal device; an apparatus, for example, a chip, in a terminal device; or an apparatus that can be used together with a terminal device. In a design, the communication apparatus may include a module corresponding to the method/operation/step/action described in the first aspect, the second aspect, or the third aspect. The module may be a hardware circuit, or may be software, or may be implemented by a combination of a hardware circuit and software.

According to a fifth aspect, a communication apparatus is provided. The apparatus may be a terminal device; an apparatus, for example, a chip, in a terminal device; or an apparatus that can be used together with a terminal device. The apparatus includes a processor and a transceiver, and may further include a memory. The processor is configured to invoke program code stored in the memory, to perform some or all operations in any one of the implementations of the first aspect, the second aspect, or the third aspect.

Optionally, the memory is a nonvolatile memory.

Optionally, the memory and the processor are coupled to each other.

According to a sixth aspect, a computer-readable storage medium is provided. The computer-readable storage medium stores program code, and the program code includes instructions used to perform some or all operations in any one of the implementations of the first aspect, the second aspect, or the third aspect.

Optionally, the foregoing computer-readable storage medium is located in a communication apparatus.

According to a seventh aspect, an embodiment of this application provides a computer program product. When the computer program product runs on a communication apparatus, the communication apparatus is enabled to perform some or all operations in any one of the implementations of the first aspect, the second aspect, or the third aspect.

According to an eighth aspect, a chip is provided. The chip includes a processor, and the processor is configured to perform some or all operations in any one of the implementations of the first aspect, the second aspect, or the third aspect.

According to a ninth aspect, a communication system is provided. The communication system includes one or more of the following:
- the communication apparatus according to the fourth aspect;
- the communication apparatus according to the fifth aspect;
- the computer-readable storage medium according to the sixth aspect;
- the computer program product according to the seventh aspect; or the chip according to the eighth aspect.

BRIEF DESCRIPTION OF THE DRAWINGS

FIG. 16 is a schematic block diagram of a communication apparatus according to an embodiment of this application;

FIG. 17 is a schematic block diagram of a communication apparatus according to an embodiment of this application.

DETAILED DESCRIPTION OF ILLUSTRATIVE EMBODIMENTS

Figure 1:
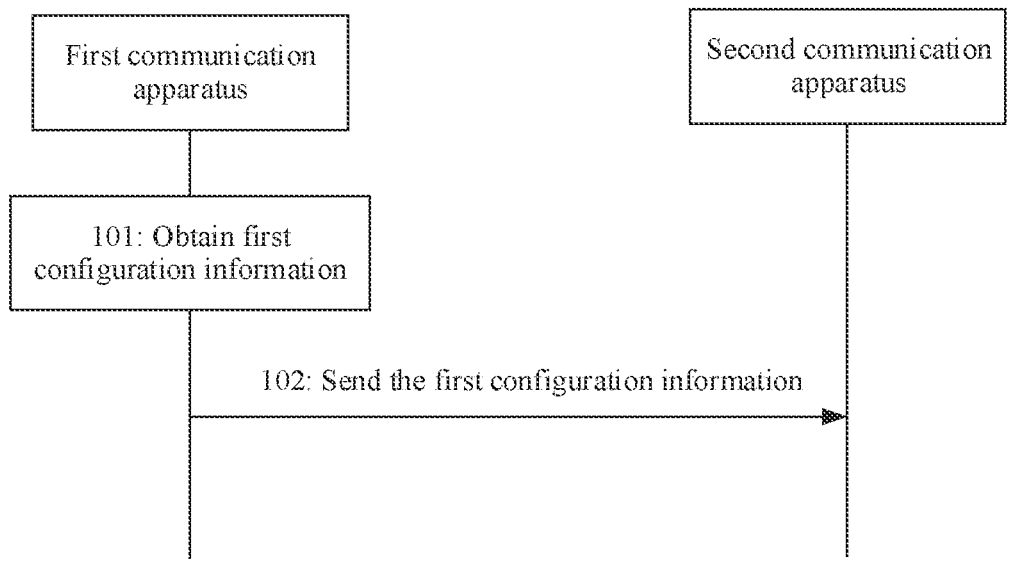
FIG. 1 is a schematic flowchart of a communication method according to an embodiment of this application.

The following describes technical solutions in this application with reference to the accompanying drawings.

The technical solutions in the embodiments of this application can be applied to a plurality of communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, a new radio (NR) system, or the like.

A communication apparatus in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The communication apparatus in this application may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device (for example, a vehicle-mounted communication unit), a wearable device, a terminal device in a future 5G network, or a terminal device in a future evolved public land mobile network (PLMN). The communication apparatus in the embodiments of this application may alternatively be a processor or a system chip that is in the foregoing various devices and that is configured to implement a corresponding function. This is not limited in the embodiments of this application.

An access network device in the embodiments of this application may be a device configured to communicate with the communication apparatus in this application. The access network device may be an evolved NodeB (eNB or eNodeB) in an LTE system, or may be a radio controller in a cloud radio access network (CRAN) scenario. Alternatively, the access network device may be a relay station, an access point, a vehicle-mounted device, a wearable device, an access network device in a future 5G network, an access network device in a future evolved PLMN, a road site unit (RSU), or the like. This is not limited in the embodiments of this application.

In the embodiments of this application, the communication apparatus or the access network device may include a hardware layer, an operating system layer running on the hardware layer, and an application layer running on the operating system layer. The hardware layer may include hardware such as a central processing unit (CPU), a memory management unit (MMU), and a memory (which is also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software.

The embodiments of this application can be applied to a scenario in which direct communication, such as device-to-device (device to device, D2D) communication or vehicle-to-everything (vehicle to everything, V2X) communication, is performed between communication apparatuses.

It should be understood that, in this application, not all steps in the embodiments are performed strictly based on a sequence indicated by sequence numbers, provided that the steps are performed in a sequence that conforms to logic. In addition, in this application, not all steps have a dependency relationship, and steps without the dependency relationship may be independently performed.

FIG. 1 is a schematic flowchart of a communication method according to an embodiment of this application. The method shown in FIG. 1 may be performed by a first communication apparatus. The method shown in FIG. 1 includes steps 101 and 102. The following describes steps 101 and 102 in detail.

101: The first communication apparatus obtains first configuration information.

For example, the first configuration information includes configuration information of a first sidelink radio bearer, the first sidelink radio bearer is used to carry a first unicast service, the first unicast service is a unicast service between the first communication apparatus and a second communication apparatus, and a first sidelink is a radio link between the first communication apparatus and the second communication apparatus.

The first sidelink radio bearer may include either of an SL-DRB and an SL-SRB, or the first sidelink radio bearer includes both an SL-DRB and an SL-SRB.

When the first sidelink radio bearer includes the SL-DRB, the first configuration information includes configuration information of the SL-DRB.

For example, the configuration information of the SL-DRB may include one or more of the following information: information about a relationship of mapping a QoS flow to the SL-DRB, packet data convergence protocol (PDCP) configuration information, radio link control (RLC) layer configuration information, and logical channel (LCH) configuration information.

For example, all QoS flows have a same QoS parameter, and the QoS parameter may be a 5G quality of service identifier (5G QoS identifier, 5QI), a quality of service flow identifier (QoS flow identifier, QFI), a V2X quality of service identifier (V2X QoS identifier, VQI), or another QoS parameter that can reflect reliability, a latency, a priority, or a transmission rate of the service.

The following describes the PDCP configuration information, the RLC configuration information, and the LCH configuration information in detail.

The PDCP configuration information includes one or more of the following information:
- a timer discardTimer for controlling duration during which one PDCP service data unit (SDU) can be stored in a PDCP buffer;
- a timer t-Reordering for waiting for an out-of-order data packet in a reordering function;
- whether a PDCP layer can deliver out-of-order data packets to an upper layer;
- whether sidelink data compression is performed at the PDCP layer and configuration information related to sidelink data compression;
- a length of a sequence number (SN) used for a PDU at the PDCP layer;
- a security configuration used for a PDCP entity, where the security configuration includes whether encryption and/or integrity protection are/is used;
- security algorithms (an integrity protection algorithm and an encryption algorithm) and/or a key used for the PDCP entity;
- whether a duplication mechanism and a duplication configuration are used at the PDCP layer, where if the duplication mechanism is used, the PDCP entity corresponds to two or more RLC entities and LCHs; and a related configuration of a header compression algorithm at the PDCP layer, for example, whether header compression is used.

For example, the configuration information related to sidelink data compression may include a size of a compressed buffer and a dictionary used for compression. The duplication mechanism refers to a mechanism in which the PDCP entity duplicates a PDCP PDU and delivers a duplicated PDCP PDU to two or more associated RLC entities for processing and transmission.

The RLC configuration information includes a mode used by the RLC entity, for example, an acknowledged mode (AM), an unacknowledged mode (UM), or a transparent mode (TM).

The RLC configuration information specifically includes different information based on different modes used by the RLC entity. The following describes the information specifically included in the RLC configuration information in various modes:

when the RLC entity is configured to use the AM mode, the RLC configuration information further includes any one or more of the following: an SN length of a PDU at an RLC layer, a timer t-PollRetransmit for controlling initiation of poll retransmission, a parameter pollPDU for controlling a quantity of RLC PDUs that need to be sent before poll initiation, a parameter pollByte for controlling a quantity of bytes of an RLC PDU that needs to be sent before poll initiation, or a maximum quantity of times of retransmission maxRetxThreshold at the RLC layer;

when the RLC entity is configured to use the UM mode, the RLC configuration information further includes an SN length of a PDU at an RLC layer;

when a receiving RLC entity is configured to use the AM mode, the RLC configuration information further includes any one or more of the following: an SN length of a PDU at an RLC layer, a timer t-Reassembly for controlling the RLC layer to wait for segmentation, or a timer t-StatusProhibit for controlling the RLC layer to avoid frequently sending status reports; or when a receiving RLC entity is configured to use the UM mode, the RLC configuration information further includes an SN length of a PDU at an RLC layer and/or a timer t-Reassembly for controlling the RLC layer to wait for segmentation.

The LCH configuration information includes one or more of the following information:

an LCH identifier;

an identifier of a logical channel group to which an LCH belongs;

a related parameter for performing logical channel prioritization (LCP) processing, for example, a priority (which refers to a priority of a logical channel), a prioritized bit rate (PBR), or bucket size duration (BSD);

information about a carrier that can be used to transmit data on the LCH;

information about a resource mode, for example, a mode 1 or a mode 2, that can be used to transmit data on the LCH;

information about a set of parameters (numerologies), for example, a subcarrier spacing, a cyclic prefix length, resource time-domain duration, and whether a grant resource can be configured, of a resource that can be used to transmit data on the LCH;

a parameter SR-mask for controlling whether the LCH can trigger a scheduling request (SR); or a parameter SR-DelayTimerApplied for controlling whether the LCH can delay SR triggering.

The foregoing mode 1 corresponds to a manner in which a base station schedules a resource, and the foregoing mode 2 corresponds to a scheduling manner in which a communication apparatus selects a resource.

Optionally, the first configuration information may further include resource configuration information of a unicast connection for unicast communication between the first communication apparatus and the second communication apparatus, synchronization source configuration information and capability information of the first communication apparatus.

For example, the resource configuration information may include information about a carrier available for the first sidelink radio bearer, a resource pool configuration, or a bandwidth part (band width part, BWP) configuration. For example, the resource configuration information indicates carriers/resource pools/BWPs in which the second communication apparatus may send and receive data or control signaling of the unicast connection.

The synchronization source configuration information is used to indicate a synchronization source used by the first communication apparatus to perform the first unicast service. For example, the synchronization source used by the first communication apparatus to perform the first unicast service may be the first communication apparatus, or may be a satellite.

The capability information of the first communication apparatus is used to indicate a capability that can be supported when the first communication apparatus performs sidelink unicast communication, for example, whether a PDCP duplication mechanism is supported, and whether sidelink data compression is supported.

Optionally, the first sidelink radio bearer is a radio bearer that can satisfy a service requirement corresponding to QoS information of the first unicast service.

When the first sidelink radio bearer is the radio bearer that can satisfy the service requirement corresponding to the QoS information of the first unicast service, the first configuration information is exchanged between the first communication apparatus and the second communication apparatus, so that the first communication apparatus and the second communication apparatus can perform the first unicast service based on the first configuration information, thereby satisfying the service requirement of the first unicast service.

Optionally, the obtaining, by the first communication apparatus, first configuration information includes: determining, by the first communication apparatus, the first configuration information based on the QoS information of the first unicast service.

For example, the first communication apparatus may determine, based on preconfigured (all) mapping relationships between QoS flows and SL-DRB configurations, and the QoS information of the first unicast service, an SL-DRB that matches QoS of the first unicast service, to generate the first configuration information (for example, the first configuration information may include configuration information of the SL-DRB that matches the QoS of the first unicast service).

102: The first communication apparatus sends the first configuration information to the second communication apparatus, and the second communication apparatus receives the first configuration information.

In this application, configuration information of a sidelink radio bearer that carries a unicast service is exchanged between communication apparatuses, so that data of the unicast service can be better transmitted between the communication apparatuses based on the configuration information of the sidelink radio bearer.

The method shown in FIG. 1 is not only applicable to a case in which a unicast connection exists between the first communication apparatus and the second communication apparatus, but also applicable to a case in which no unicast connection currently exists between the first communication apparatus and the second communication apparatus.

The following separately describes in detail the case in which the unicast connection exists between the first communication apparatus and the second communication apparatus and the case in which no unicast connection exists between the first communication apparatus and the second communication apparatus.

For the case in which the unicast connection exists between the first communication apparatus and the second communication apparatus:

Optionally, in an embodiment, when the unicast connection exists between the first communication apparatus and the second communication apparatus, and a sidelink radio bearer of the existing unicast connection between the first communication apparatus and the second communication apparatus does not satisfy the service requirement corresponding to the quality of service QoS information of the first unicast service, the first communication apparatus sends the first configuration information to the second communication apparatus.

The service requirement corresponding to the QoS information of the first unicast service may also be referred to as a service requirement of the first unicast service.

The first sidelink radio bearer may be a radio bearer that can satisfy the service requirement corresponding to the QoS information of the first unicast service.

In this application, when the sidelink radio bearer of the existing unicast connection does not satisfy the service requirement corresponding to the QoS information of the first unicast service, the first configuration information is exchanged between the communication apparatuses, so that the first communication apparatus and the second communication apparatus can update a configuration of the sidelink radio bearer of the existing unicast connection based on the first configuration information. Therefore, when the first unicast service is subsequently performed, the service requirement corresponding to the QoS information of the first unicast service can be satisfied.

Optionally, when the unicast connection exists between the first communication apparatus and the second communication apparatus, and a sidelink radio bearer of the existing unicast connection between the first communication apparatus and the second communication apparatus does not satisfy the service requirement corresponding to the quality of service QoS information of the first unicast service, the method shown in FIG. 1 further includes: updating, by the first communication apparatus, a configuration parameter of the sidelink radio bearer of the existing unicast connection based on the first configuration information.

In this application, when the sidelink radio bearer of the existing unicast connection does not satisfy the service requirement corresponding to the quality of service QoS information of the first unicast service, the configuration parameter of the sidelink radio bearer of the existing unicast connection is updated, so that the sidelink radio bearer of the existing unicast connection can satisfy the service requirement corresponding to the QoS information of the first unicast service, and the first unicast service can be normally performed.

It should be understood that, in the method shown in FIG. 1, before sending the first configuration information to the second communication apparatus, the first communication apparatus may first determine whether the unicast connection exists between the first communication apparatus and the second communication apparatus, and when the unicast connection exists between the first communication apparatus and the second communication apparatus, determine whether the sidelink radio bearer of the existing unicast connection can satisfy the service requirement corresponding to the QoS information of the first unicast service.

Optionally, the method shown in FIG. 1 further includes: The first communication apparatus determines whether the unicast connection exists between the first communication apparatus and the second communication apparatus. When the unicast connection exists between the first communication apparatus and the second communication apparatus, the first communication apparatus determines whether the sidelink radio bearer of the existing unicast connection satisfies the service requirement corresponding to the QoS information of the first unicast service.

For example, when it is determined whether the sidelink radio bearer of the existing unicast connection satisfies the service requirement corresponding to the QoS information of the first unicast service, QoS information of a unicast service that can be provided by the sidelink radio bearer of the existing unicast connection may be first determined based on configuration information of the sidelink radio bearer of the existing unicast connection, and then the QoS information of the unicast service that can be provided is compared with the QoS information of the first unicast service. By determining whether the QoS information of the first unicast service is included in the QoS information of the unicast service that can be provided, it is determined whether the sidelink radio bearer of the existing unicast connection can satisfy the service requirement corresponding to the QoS information of the first unicast service.

Optionally, that the first communication apparatus determines whether the sidelink radio bearer of the existing unicast connection satisfies the service requirement corresponding to the QoS information of the first unicast service specifically includes: a non-access stratum of the first communication apparatus indicates first information to an access stratum of the first communication apparatus; and the access stratum of the first communication apparatus determines, based on the first information, that the sidelink radio bearer of the existing unicast connection does not satisfy the service requirement corresponding to the QoS information of the first unicast service.

The first information includes the QoS information of the first unicast service, or the first information includes the QoS information of the first unicast service and identifier information of the second communication apparatus.

It should be understood that when the sidelink radio bearer of the existing unicast connection does not satisfy the service requirement corresponding to the QoS information of the first unicast service, step 102 of sending, by the first communication apparatus, the first configuration information to the second communication apparatus in the method shown in FIG. 1 is performed. When the sidelink radio bearer of the existing unicast connection does not satisfy the service requirement corresponding to the QoS information of the first unicast service (in this case, the configuration parameter of the sidelink radio bearer of the existing unicast connection may not be updated), step 102 may not be performed, but the service data of the first unicast service may be directly exchanged between the first communication apparatus and the second communication apparatus.

The foregoing separately describes in detail the case in which the unicast connection exists between the first communication apparatus and the second communication apparatus, and the following describes the case in which no unicast connection exists between the first communication apparatus and the second communication apparatus.

For the case in which no unicast connection exists between the first communication apparatus and the second communication apparatus:

When no unicast connection exists between the first communication apparatus and the second communication apparatus, a unicast connection needs to be first established between the first communication apparatus and the second communication apparatus, then a configuration parameter of a sidelink radio bearer of the unicast connection is configured, and then the sidelink radio bearer of the unicast connection is used to carry the first unicast service.

When the unicast connection is established between the first communication apparatus and the second communication apparatus, there may be two manners of establishing the unicast connection depending on whether a unicast establishment request message carries the first configuration information. The following describes the two manners.

First manner: The unicast establishment request message carries the first configuration information.

Figure 2:
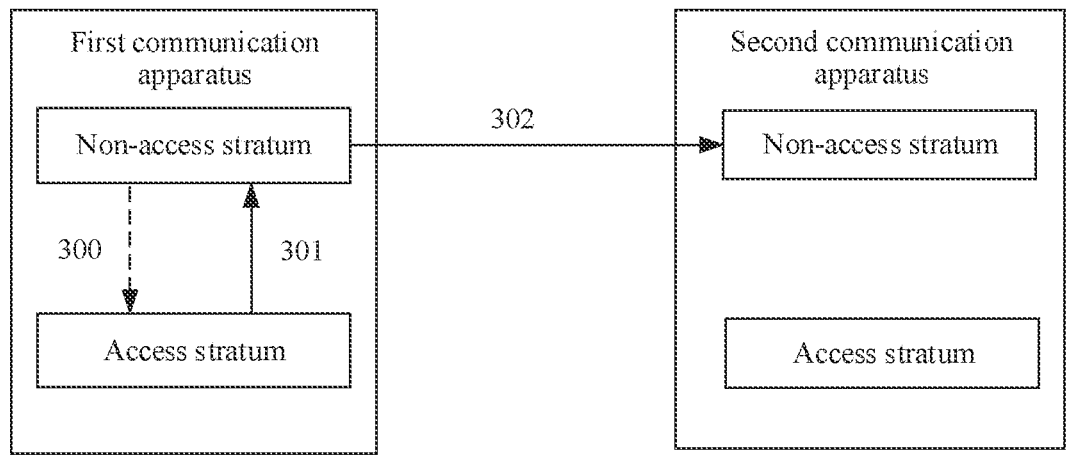
FIG. 2 is a schematic diagram in which a first communication apparatus sends a first request message to a second communication apparatus.

In the first manner, a process of establishing the unicast connection between the first communication apparatus and the second communication apparatus may be shown in FIG. 2. As shown in FIG. 2, steps of establishing the unicast connection between the first communication apparatus and the second communication apparatus are as follows:

301: A non-access stratum of the first communication apparatus obtains the first configuration information from an access stratum of the first communication apparatus.

302: The non-access stratum of the first communication apparatus sends a first request message to a non-access stratum of the second communication apparatus.

For example, in step 301, the non-access stratum of the first communication apparatus may actively obtain the first configuration information from the access stratum of the first communication apparatus; or the non-access stratum of the first communication apparatus may obtain the first configuration information by receiving the first configuration information sent by the access stratum of the first communication apparatus.

For example, in step 302, the first request message is used to establish a first unicast connection between the first communication apparatus and the second communication apparatus, the first request message includes the first configuration information, and the first unicast connection is used to transmit the service data of the first unicast service between the first communication apparatus and the second communication apparatus.

In the first manner, the first communication apparatus directly includes the first configuration information in the first request message in a process of establishing the unicast connection, so that the second communication apparatus can obtain the first configuration information in the process of establishing the unicast connection.

It should be understood that, after receiving the first request message sent by the first communication apparatus, the second communication apparatus may cooperate with the first communication apparatus to establish the first unicast connection, and send a unicast connection establishment complete message to the first communication apparatus after the first unicast connection is established, to notify the first communication apparatus that the first unicast connection is established.

To obtain the first configuration information from the access stratum of the first communication apparatus, the non-access stratum of the first communication apparatus may further perform step 300 before step 301.

300: The non-access stratum of the first communication apparatus indicates one or more of the following information to the access stratum of the first communication apparatus: unicast type indication information, identifier information of the first communication apparatus, identifier information of the second communication apparatus, and the QoS information of the first unicast service.

Optionally, the identifier information of the first communication apparatus includes an application layer identifier and/or a non-access stratum identifier of the first communication apparatus and/or a source layer 2 identifier (source L2 ID) of the first communication apparatus.

Optionally, the identifier information of the second communication apparatus includes an application layer identifier and/or a non-access stratum identifier of the second communication apparatus and/or a source layer 2 identifier (source L2 ID) of the second communication apparatus.

In step 300, the non-access stratum of the first communication apparatus indicates the foregoing information to the access stratum of the first communication apparatus, so that the access stratum of the first communication apparatus can be triggered to send the first configuration information to the non-access stratum of the first communication apparatus; and therefore, the non-access stratum of the first communication apparatus can obtain the first configuration information.

Figure 3:
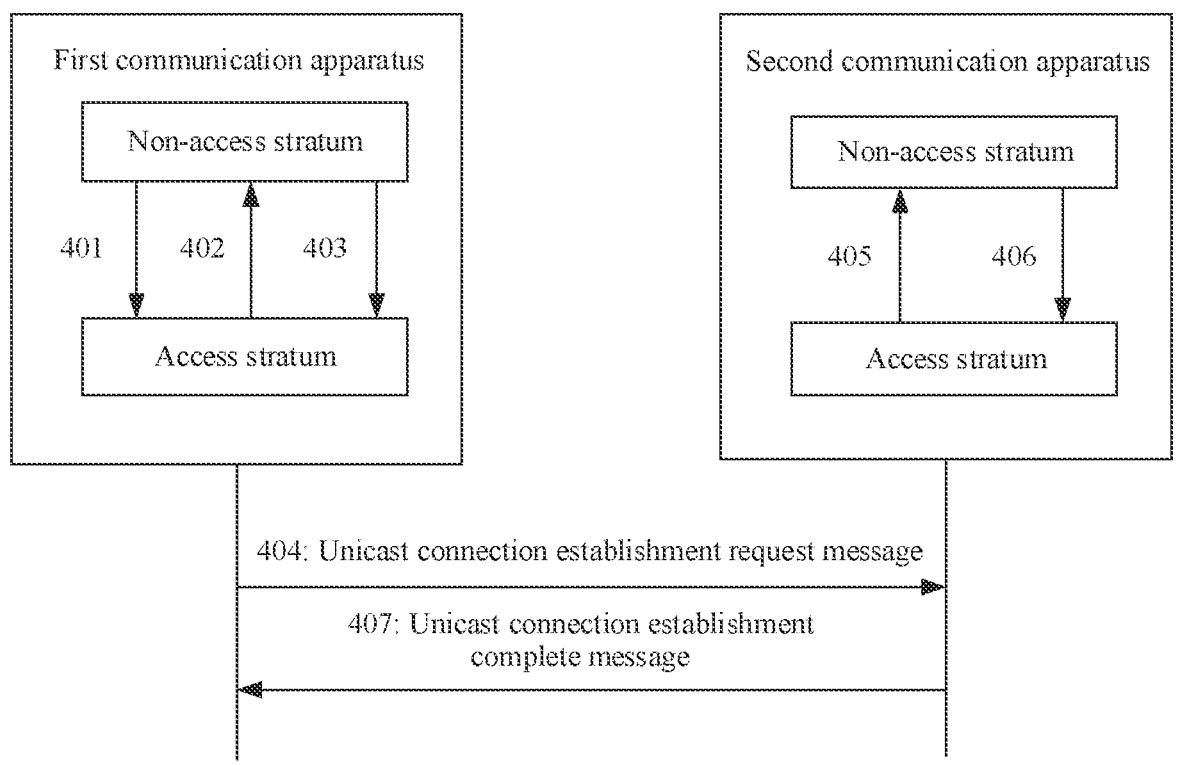
FIG. 3 is a schematic diagram of a process of establishing a unicast connection between a first communication apparatus and a second communication apparatus.

With reference to FIG. 3, the following describes, by using a specific example, in detail the process of establishing the first unicast connection in the first manner. FIG. 3 is a schematic diagram of a process of establishing a unicast connection between the first communication apparatus and the second communication apparatus. The process shown in FIG. 3 includes the following steps.

401: The non-access stratum of the first communication apparatus indicates any one or more of the following information to the access stratum of the first communication apparatus: the unicast type indication information, the identifier information of the first communication apparatus, the identifier information of the second communication apparatus, and the QoS information of the first unicast service.

402: The access stratum of the first communication apparatus obtains configuration information of a first unicast connection, and sends the configuration information of the first unicast connection to the non-access stratum of the first communication apparatus.

For example, the configuration information of the first unicast connection is the first configuration information.

403: The non-access stratum of the first communication apparatus includes the first configuration information and other upper-layer information (for example, user information, where the user information may specifically include authentication information and/or security encryption information) in a unicast connection establishment request message, sends the unicast connection establishment request message to the access stratum, and indicates the access stratum to send the unicast connection establishment request message to the outside through broadcast.

404: The access stratum of the first communication apparatus sends the unicast connection establishment request message to the outside through broadcast as indicated by the non-access stratum of the first communication apparatus.

For example, in step 404, the unicast connection establishment request message may be transmitted by using a broadcast SL-DRB corresponding to a V2X service to which the unicast connection belongs, that is, the unicast connection establishment request message is transmitted together with other broadcast data. In addition, in a PDCP PDU corresponding to the unicast connection establishment request message, a field (for example, an SDU-type field) in a PDCP header may be used to indicate that a corresponding PDCP SDU belongs to a non-access stratum message. Optionally, the V2X service on which the unicast connection request message is attached may correspond to a plurality of broadcast SL-DRBs. In this case, the unicast connection establishment request message may be transmitted by using an SL-DRB having a highest priority.

Optionally, the unicast connection establishment request message may alternatively be transmitted by using a special SL-SRB. A configuration of the SL-SRB is a default configuration, and the SL-SRB exists before the unicast connection is established.

405: An access stratum of the second communication apparatus receives the unicast connection establishment request message, and transmits the unicast connection establishment request message to the non-access stratum of the second communication apparatus.

406: The non-access stratum of the second communication apparatus parses the unicast connection establishment request message to obtain the first configuration information and the other upper-layer configuration information, and indicates the access stratum to transmit a unicast connection establishment complete message.

407: The access stratum of the second communication apparatus obtains the first configuration information and the other upper-layer configuration information, establishes an SL-DRB of the first unicast connection, and sends the unicast connection establishment complete message to the access stratum of the first communication apparatus through unicast or broadcast, to indicate that the first unicast connection is established.

It should be understood that, in step 302 shown in FIG. 3, the non-access stratum of the first communication apparatus sends the first request message to the non-access stratum of the second communication apparatus. Essentially, the first request message or the unicast connection establishment request message is indirectly sent to the non-access stratum of the second communication apparatus through the access stratum of the first communication apparatus and the access stratum of the second communication apparatus (refer to steps 404 and 405).

In step 402, the access stratum of the first communication apparatus may obtain the configuration information of the first unicast connection in a plurality of manners. For example, the configuration information of the first unicast connection may be obtained from an access network device. The following describes this case in detail with reference to FIG. 5.

Figure 4:
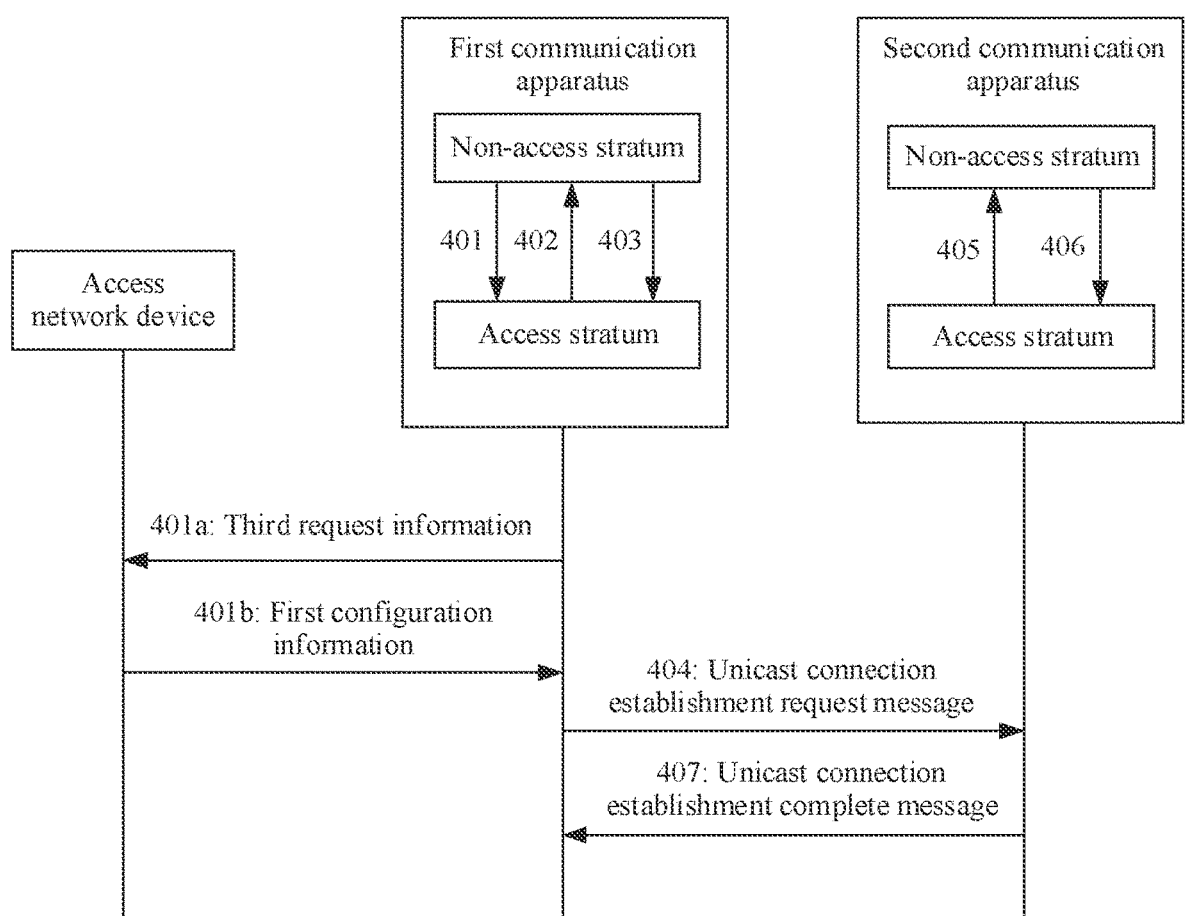
FIG. 4 is a schematic diagram of a process of establishing a unicast connection between a first communication apparatus and a second communication apparatus.
Figure 5:
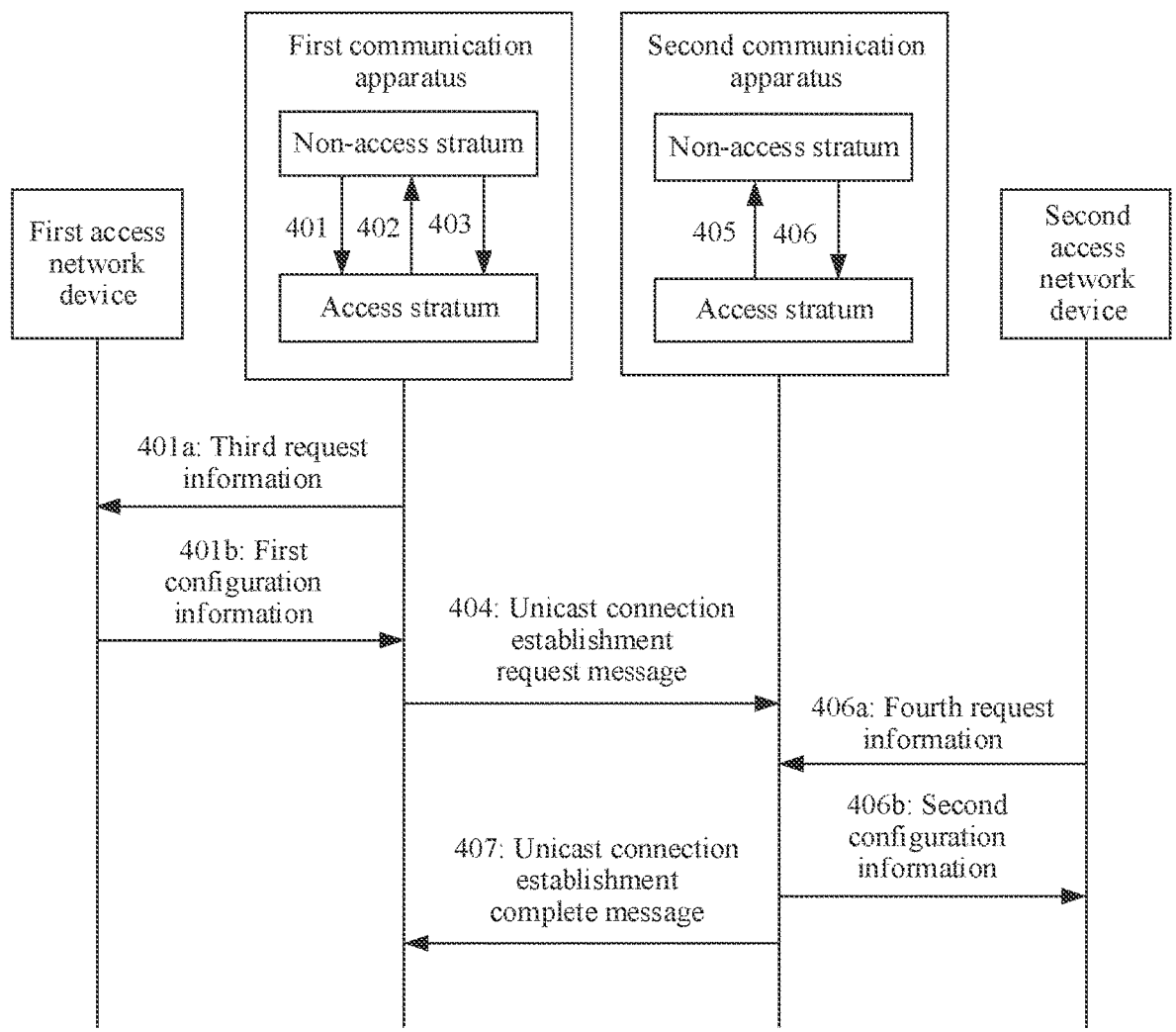
FIG. 5 is a schematic diagram of a process of establishing a unicast connection and exchanging first configuration information and second configuration information between a first communication apparatus and a second communication apparatus.

FIG. 5 is a schematic diagram of a process of establishing a unicast connection between the first communication apparatus and the second communication apparatus. Compared with the process shown in FIG. 4, step 401*a* and step 401*b* are added to the process shown in FIG. 5. The following describes the two steps.

401*a*: The access stratum of the first communication apparatus sends a third request message to the access network device, to obtain the first configuration information.

401*b*: The first communication apparatus receives the first configuration information sent by the access network device.

For example, the third request message may be specifically radio resource control (RRC) signaling. For the first communication apparatus in an RRC connected mode, after receiving the indication of the non-access stratum of the second communication apparatus (step 401), the access stratum of the first communication apparatus may send the third request message to the access network device (step 401*a*). The third request message may carry V2X unicast information (for example, layer 2 identifiers (L2 IDs) of the first communication apparatus and the second communication apparatus and a communication (cast) type (which may be specifically unicast, multicast, or broadcast) between the first communication apparatus and the second communication apparatus), QoS information, and the like. The access network device provides the first configuration information for the first communication apparatus based on the request of the first communication apparatus by using RRC signaling. The first configuration information may include a mapping relationship between a QoS flow and an SL-DRB, an SL-DRB configuration, a resource pool configuration, a synchronization source configuration, and the like.

Optionally, the first configuration information may alternatively be obtained from a system message broadcast by the access network device.

It should be understood that the first configuration information may alternatively be preconfigured. For example, the first communication apparatus may determine the first configuration information based on a prestored mapping relationship between QoS information and an SL-DRB.

It should be understood that, when the first unicast service is performed between the first communication apparatus and the second communication apparatus, a configuration of the SL-DRB of the first unicast connection of the second communication apparatus may completely comply with the first configuration information sent by the first communication apparatus, that is, both a receiving configuration and a sending configuration of the SL-DRB of the first unicast connection of the second communication apparatus may be obtained from the first configuration information.

Optionally, the receiving configuration of the SL-DRB of the first unicast connection of the second communication apparatus may be obtained from the first configuration information, and the sending configuration of the SL-DRB of the first unicast connection of the second communication apparatus may be different from that in the first configuration information. This case is described below with reference to FIG. 5.

As shown in FIG. 5, a process in which the second communication apparatus obtains transmit-side configuration information of the SL-DRB of the first unicast connection and sends the configuration information to the second communication apparatus is step 406*a* and step 406*b*.

406*a*: The second communication apparatus sends fourth request information to a second access network device.

406*b*: The second communication apparatus receives second configuration information sent by the second access network device.

For example, for the second communication apparatus, after the access stratum receives the first configuration information indicated by the non-access stratum (step 406), the access stratum may obtain a transmit-side configuration of the SL-DRB of the first unicast connection by sending the fourth request information to the second access network device in step 406*a*.

After obtaining the transmit-side configuration of the SL-DRB of the first unicast connection, when communicating with the first communication apparatus, the second communication apparatus needs to ensure that the first communication apparatus uses a corresponding receive-side configuration, and the second communication apparatus may send the second configuration information to the first communication apparatus (where the second configuration information may be carried in the unicast establishment complete message in step 407), so that the first communication apparatus obtains the receive-side configuration corresponding to the SL-DRB of the first unicast connection.

After completing step 406b, the second communication apparatus may send the unicast connection establishment complete message to the first communication apparatus in step 407, where the unicast connection establishment complete message carries the second configuration information.

For example, in FIG. 5, the first communication apparatus and the second communication apparatus may separately obtain corresponding configuration information from a first access network device and the second access network device. The first access network device and the second access network device herein may be a same device, or may be different devices.

Second manner: The unicast establishment request message does not carry the first configuration information.

Figure 6:
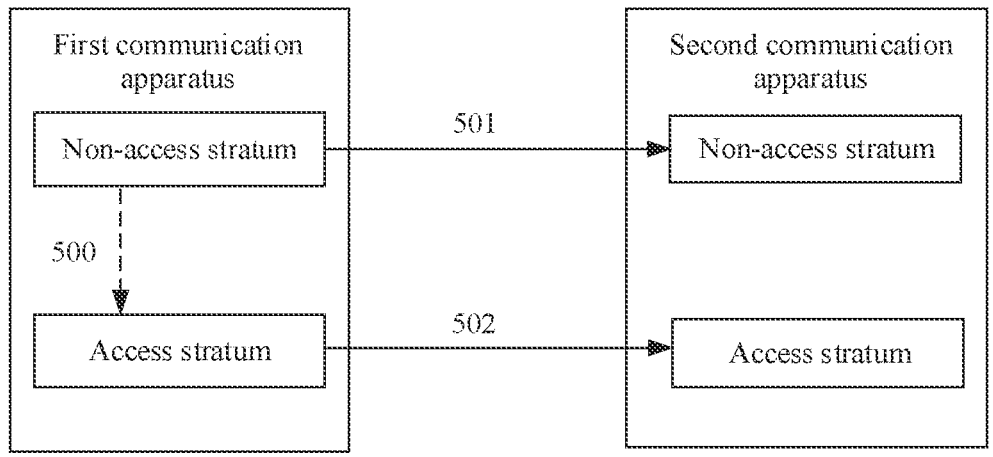
FIG. 6 is a schematic diagram in which a first communication apparatus sends a second request message to a second communication apparatus.

In the second manner, a process of establishing the unicast connection between the first communication apparatus and the second communication apparatus may be shown in FIG. 6. As shown in FIG. 6, steps of establishing the unicast connection and transmitting the first configuration information between the first communication apparatus and the second communication apparatus are as follows:

501: A non-access stratum of the first communication apparatus sends a second request message to a non-access stratum of the second communication apparatus.

502: An access stratum of the first communication apparatus sends the first configuration information to an access stratum of the second communication apparatus.

For example, the second request message is used to establish a second unicast connection between the first communication apparatus and the second communication apparatus, the second unicast connection is used to transmit the service data of the first unicast service between the first communication apparatus and the second communication apparatus.

In the second manner, the access stratum of the first communication apparatus sends the first configuration information to the access stratum of the second communication apparatus.

Optionally, in the second manner, to trigger the access stratum of the first communication apparatus to send the first configuration information to the access stratum of the second communication apparatus, the first communication apparatus may further perform the following step:

500: The non-access stratum of the first communication apparatus indicates any one or more of the following information to the access stratum of the first communication apparatus: unicast type indication information, identifier information of the first communication apparatus, identifier information of the second communication apparatus, and the QoS information of the first unicast service.

In step 500, the identifier information of the first communication apparatus may include an application layer identifier and/or a non-access stratum identifier of the first communication apparatus and/or a source layer 2 identifier (source L2 ID) of the first communication apparatus. The identifier information of the second communication apparatus may include an application layer identifier and/or a non-access stratum identifier of the second communication apparatus and/or a source layer 2 identifier (source L2 ID) of the second communication apparatus.

In step 500, the non-access stratum of the first communication apparatus can trigger, by indicating the information to the access stratum of the first communication apparatus, the access stratum of the first communication apparatus to send the first configuration information to the access stratum of the second communication apparatus, so that the second communication apparatus obtains the first configuration information, and further prepares for subsequent execution of the first unicast service.

Figure 7:
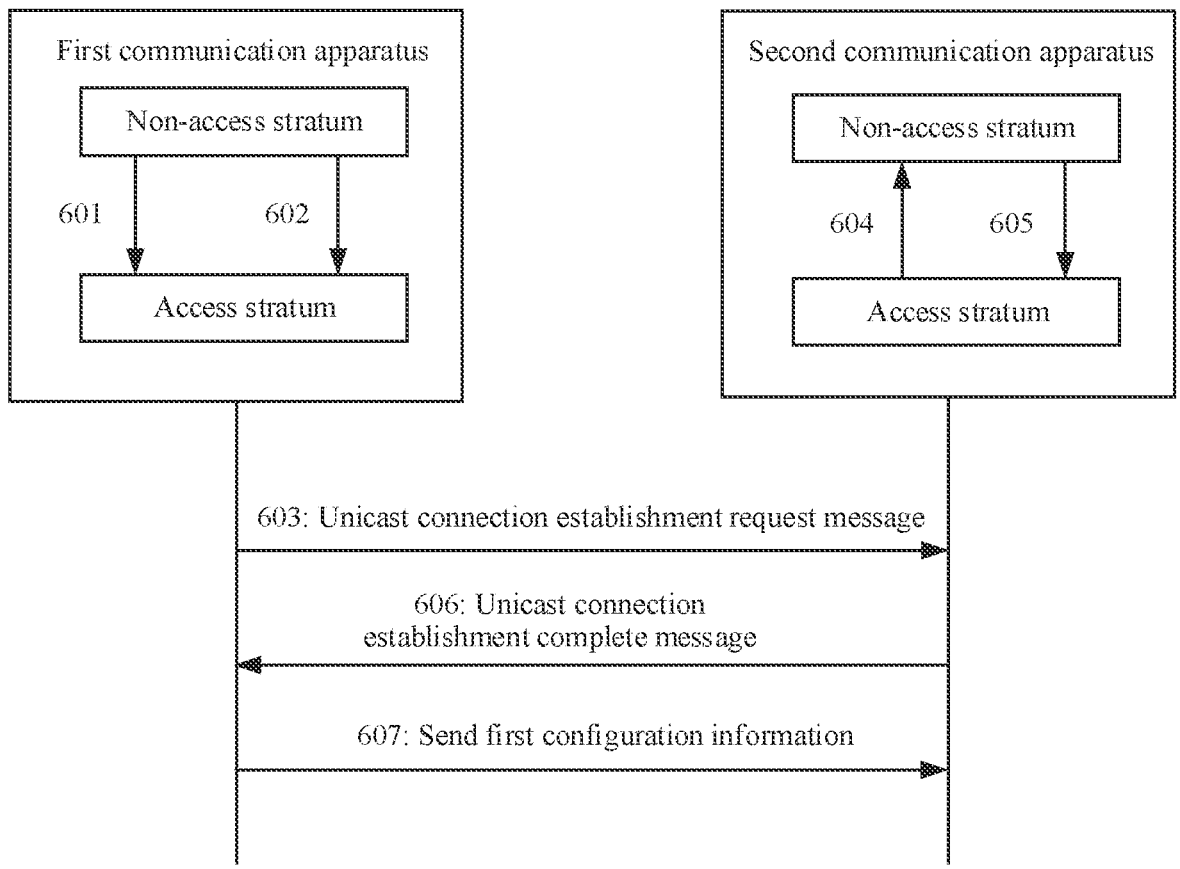
FIG. 7 is a schematic diagram of a process of establishing a unicast connection between a first communication apparatus and a second communication apparatus.

With reference to FIG. 7, the following describes, by using a specific example, in detail the process of establishing the second unicast connection in the second manner. FIG. 7 is a schematic diagram of the process of establishing the unicast connection between the first communication apparatus and the second communication apparatus. The process shown in FIG. 7 includes the following steps.

601: The non-access stratum of the first communication apparatus indicates any one or more of the following information to the access stratum of the first communication apparatus: the unicast type indication information, the identifier information of the first communication apparatus, the identifier information of the second communication apparatus, and the QoS information of the first unicast service.

602: The non-access stratum of the first communication apparatus generates a unicast connection establishment request message, sends the unicast connection establishment request message to the access stratum of the first communication apparatus, and indicates the access stratum to send the unicast connection establishment request message to the outside through broadcast.

603: The access stratum of the first communication apparatus sends the unicast connection establishment request message to the outside through broadcast as indicated by the non-access stratum of the first communication apparatus.

A specific processing process of step 603 is the same as the specific processing process of step 404, and details are not described herein again.

604: The non-access stratum of the second communication apparatus parses the unicast connection establishment request message to obtain related information for establishing the unicast connection.

605: The non-access stratum of the second communication apparatus generates a unicast connection establishment complete message, sends the unicast connection establishment complete message to the access stratum of the second communication apparatus, and indicates the access stratum to send the unicast connection establishment complete message to the outside through unicast or broadcast.

606: The access stratum of the second communication apparatus sends the unicast connection establishment complete message to the access stratum of the first communication apparatus through unicast or broadcast, to indicate that the second unicast connection is established.

607: The access stratum of the first communication apparatus sends the first configuration information to the access stratum of the second communication apparatus.

For example, in step 607, the access stratum of the first communication apparatus may transmit the first configuration information by using an SL-SRB. After the unicast connection is established, a subsequent non-access stratum message may also be transmitted by using the SL-SRB.

Configuration information of the SL-SRB may be preconfigured in the first communication apparatus. After the second unicast connection is established, the first communication apparatus establishes a default SL-SRB based on the preconfigured information. In this case, the first configuration information may be transmitted by using the SL-SRB.

The configuration information of the SL-SRB may alternatively be obtained in the process of establishing the unicast connection. For example, after obtaining the configuration information of the SL-SRB, the access stratum of the first communication apparatus indicates the configuration information of the SL-SRB to the non-access stratum. The configuration information of the SL-SRB may be carried in the unicast establishment request message sent by the non-access stratum of the first communication apparatus to the non-access stratum of the second communication apparatus.

Figure 8:
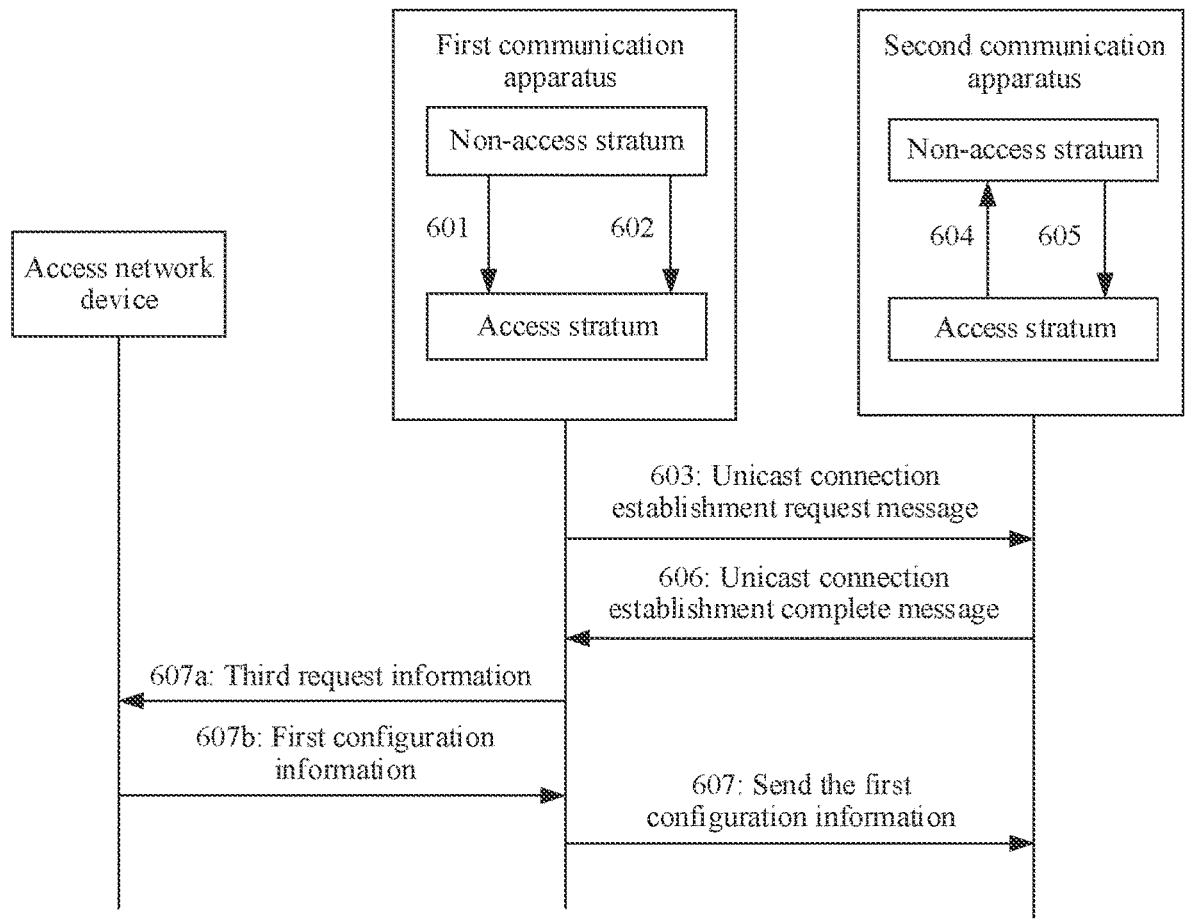
FIG. 8 is a schematic diagram of a process of establishing a unicast connection between a first communication apparatus and a second communication apparatus.

FIG. 8 is a schematic diagram of a process of establishing a unicast connection between the first communication apparatus and the second communication apparatus. Compared with the process shown in FIG. 7, step 607*a* and step 607*b* are added to the process shown in FIG. 7. The following describes the two steps.

607*a*: The access stratum of the first communication apparatus sends a third request message to an access network device, to obtain the first configuration information.

607*b*: The first communication apparatus receives the first configuration information sent by the access network device.

For example, the third request message may be specifically carried in RRC signaling. For the first communication apparatus in an RRC connected mode, after receiving the indication of the non-access stratum of the second communication apparatus (step 601), the access stratum of the first communication apparatus may send the third request message to the access network device (step 607*a*). The third request message may carry V2X unicast information (for example, layer 2 IDs (L2 IDs) of the first communication apparatus and the second communication apparatus, and a communication type, which may be specifically, for example, unicast, multicast, or broadcast, between the first communication apparatus and the second communication apparatus), QoS information, and the like. The access network device provides the first configuration information for the first communication apparatus based on the request of the first communication apparatus by using RRC signaling. The first configuration information may include a mapping relationship between a QoS flow and an SL-DRB, an SL-DRB configuration, a resource pool configuration, a synchronization source configuration, and the like.

Optionally, the first configuration information may alternatively be obtained from a system message broadcast by the access network device.

It should be understood that the first configuration information may alternatively be preconfigured. For example, when the first communication apparatus is within coverage of the access network device, the first communication apparatus may generate the first configuration information based on a prestored mapping relationship between QoS information and an SL-DRB, a resource configuration of the SL-DRB, and the like.

In the method shown in FIG. 1, to improve security of unicast communication, an identifier of a communication apparatus may be updated, and then an updated identifier of the communication apparatus is transmitted to a peer communication apparatus.

Optionally, in an embodiment, the identifier information of the first communication apparatus is updated, and the method shown in FIG. 1 further includes: sending, by the first communication apparatus, identifier update information to the second communication apparatus, where the identifier update information is used to indicate updated identifier information of the first communication apparatus.

In this application, the updated identifier information of the communication apparatus is transmitted to the peer device, so that normal unicast communication can be ensured, and the security of the unicast communication can be improved.

Optionally, in an embodiment, the non-access stratum of the first communication apparatus is a PC5 signaling layer or a V2X layer of the first communication apparatus, and the access stratum of the first communication apparatus is an RRC layer or an SL RRC layer of the first communication apparatus.

Similarly, the non-access stratum of the second communication apparatus may also be a PC5 signaling layer or a V2X layer, or the access stratum of the second communication apparatus may also be an RRC layer or an SL RRC layer.

The foregoing mainly describes the communication method in the embodiments of this application from a perspective of the first communication apparatus with reference to the accompanying drawings. The following describes the communication method in the embodiments of this application from a perspective of the second communication apparatus with reference to FIG. 9. It should be understood that the method shown in FIG. 9 corresponds to the method shown in FIG. 1, and limitations and explanations of related content in the method shown in FIG. 1 are also applicable to the method shown in FIG. 9. Repeated descriptions are properly omitted below when the method shown in FIG. 9 is described.

Figure 9:
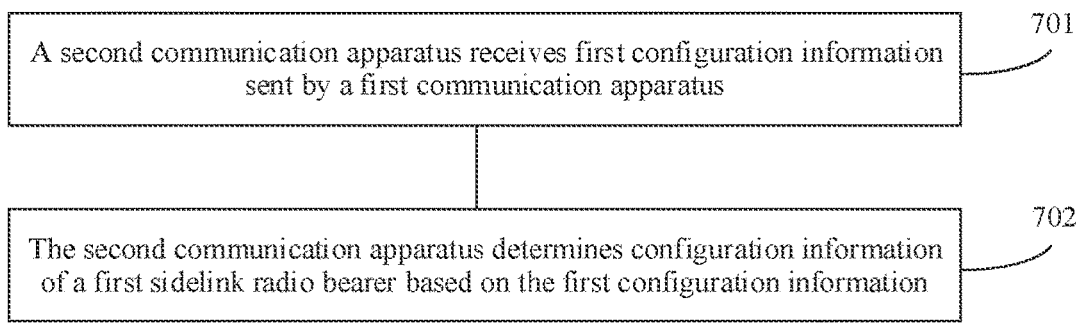
FIG. 9 is a schematic flowchart of a communication method according to an embodiment of this application.

FIG. 9 is a schematic flowchart of a communication method according to an embodiment of this application. The method shown in FIG. 9 may be performed by a second communication apparatus. The method shown in FIG. 9 includes steps 701 and 702. The following describes steps 701 and 702 in detail.

701: The second communication apparatus receives first configuration information sent by a first communication apparatus.

For example, the first configuration information includes configuration information of a first sidelink radio bearer, the first sidelink radio bearer is used to carry a first unicast service between the first communication apparatus and the second communication apparatus, and a first sidelink is a radio link between the first communication apparatus and the second communication apparatus.

702: The second communication apparatus determines the configuration information of the first sidelink radio bearer based on the first configuration information.

The first sidelink bearer may include only an SL-DRB, or may include only an SL-SRB, or may include both an SL-DRB and an SL-SRB.

Optionally, configuration information of the SL-DRB includes one or more of the following information: information about a relationship of mapping a QoS flow to the SL-DRB, PDCP configuration information, RLC configuration information, and LCH configuration information.

Optionally, the first sidelink radio bearer is a radio bearer that can satisfy a service requirement corresponding to QoS information of the first unicast service.

When the first sidelink radio bearer is the radio bearer that can satisfy the service requirement corresponding to the QoS information of the first unicast service, the first configuration information is exchanged between the first communication apparatus and the second communication apparatus, so that the first communication apparatus and the second communication apparatus can perform the first unicast service based on the first configuration information, thereby satisfying the service requirement of the first unicast service.

In this application, configuration information of a sidelink radio bearer that carries a unicast service is exchanged between communication apparatuses, so that data of the unicast service can be better transmitted between the communication apparatuses based on the configuration information of the sidelink radio bearer.

Optionally, in an embodiment, no unicast connection exists currently between the first communication apparatus and the second communication apparatus, and the receiving, by the second communication apparatus, first configuration information sent by a first communication apparatus includes: receiving, by a non-access stratum of the second communication apparatus, a first request message sent by a non-access stratum of the first communication apparatus, to establish a first unicast connection between the first communication apparatus and the second communication apparatus.

For example, the first request message includes the first configuration information, and the first unicast connection is used to transmit the service data of the first unicast service between the first communication apparatus and the second communication apparatus.

After receiving the first request message, the second communication apparatus may establish the first unicast connection to the first communication apparatus. For a specific process of establishing the first unicast connection, refer to the foregoing process of establishing the unicast connection described in the first manner.

Optionally, in an embodiment, no unicast connection exists currently between the first communication apparatus and the second communication apparatus, and the method shown in FIG. 9 further includes: receiving, by a non-access stratum of the second communication apparatus, a second request message sent by a non-access stratum of the first communication apparatus, to establish a second unicast connection between the first communication apparatus and the second communication apparatus, where the second unicast connection is used to transmit the service data of the first unicast service between the first communication apparatus and the second communication apparatus. The receiving, by the second communication apparatus, first configuration information sent by a first communication apparatus includes: receiving, by an access stratum of the second communication apparatus, the first configuration information sent by an access stratum of the first communication apparatus.

After receiving the second request message, the second communication apparatus may establish the second unicast connection to the first communication apparatus. For a specific process of establishing the second unicast connection, refer to the foregoing process of establishing the unicast connection described in the second manner.

Optionally, in an embodiment, the method shown in FIG. 9 further includes: receiving, by the second communication apparatus, identifier update information sent by the first communication apparatus, where the identifier update information is used to indicate updated identifier information of the first communication apparatus.

Figure 10:
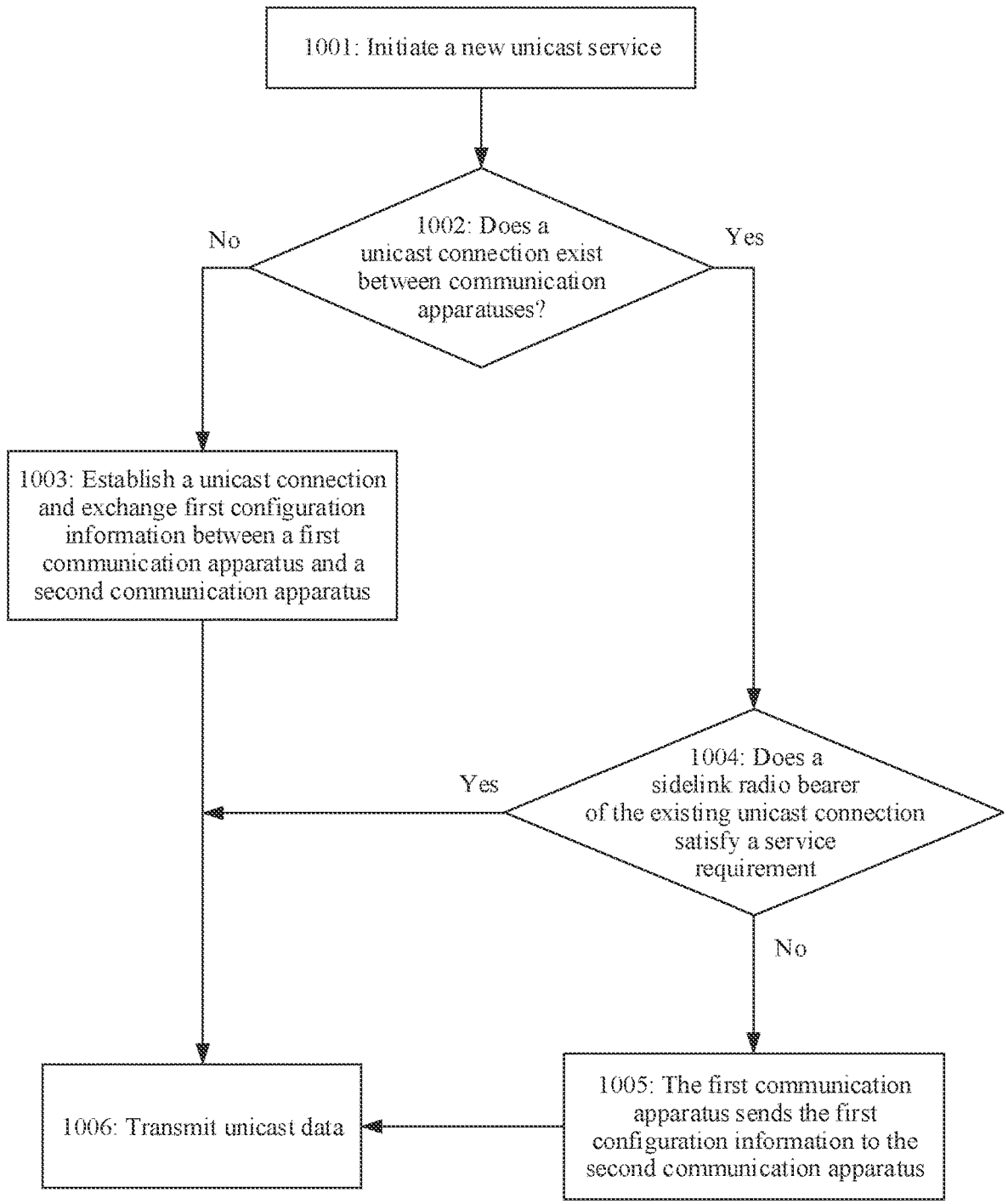
FIG. 10 is a schematic flowchart of a communication method according to an embodiment of this application.

To better understand manners of performing unicast communication between the first communication apparatus and the second communication apparatus when the unicast connection exists and when no unicast connection exists in this embodiment of this application, the following describes in detail the unicast communication manner between the first communication apparatus and the second communication apparatus with reference to FIG. 10.

FIG. 10 is a schematic flowchart of a communication method according to an embodiment of this application. The method shown in FIG. 10 may be performed by a first communication apparatus. The method shown in FIG. 10 includes steps 1001 to 1006. The following describes the steps in detail.

1001: The first communication apparatus initiates a new unicast service.

The new unicast service in step 1001 may be equivalent to the foregoing first unicast service.

1002: The first communication apparatus determines whether a unicast connection exists between the first communication apparatus and a second communication apparatus.

In step 1002, the first communication apparatus may determine, by determining whether to establish and maintain a group of SL-SRBs and/or SL-DRBs for performing unicast communication with the second communication apparatus, whether the unicast connection exists between the first communication apparatus and the second communication apparatus. If the SL-SRB/SL-DRB exists, the unicast connection exists. Otherwise, no unicast connection exists.

When it is determined in step 1002 that no unicast connection exists currently between the first communication apparatus and the second communication apparatus, to implement unicast communication, a unicast connection needs to be first established between the first communication apparatus and the second communication apparatus, and then unicast communication can be performed, that is, step 1003 and step 1006 are performed.

1003: Establish the unicast connection and exchange first configuration information between the first communication apparatus and the second communication apparatus.

It should be understood that, in step 1003, the unicast connection may be established in the foregoing first manner, or the unicast connection may be established in the foregoing second manner. For a specific unicast connection establishment process and exchange of the first configuration information, refer to related content in the foregoing first manner and second manner.

When it is determined in step 1002 that the unicast connection currently exists between the first communication apparatus and the second communication apparatus, it may be first determined whether the unicast connection can satisfy a service requirement of the new unicast service initiated by the first communication apparatus, that is, step 1004 is performed. If the existing unicast connection can satisfy the service requirement of the new unicast service, unicast communication may be performed based on the existing unicast connection, that is, step 1006 is performed. If the existing unicast connection cannot satisfy the service requirement of the new unicast service, the configuration information needs to be updated again for the existing unicast connection, that is, step 1005 is performed.

1004: Determine whether a sidelink radio bearer of the existing unicast connection satisfies the service requirement of the new unicast service.

1005: The first communication apparatus sends the first configuration information to the second communication apparatus.

That is, in step 1005, the first communication apparatus needs to send the first configuration information to the second communication apparatus, and after receiving the first configuration information, the second communication apparatus updates a configuration of the existing unicast connection based on content in the first configuration information.

1006: The first communication apparatus and the second communication apparatus transmit unicast data.

Figure 11:
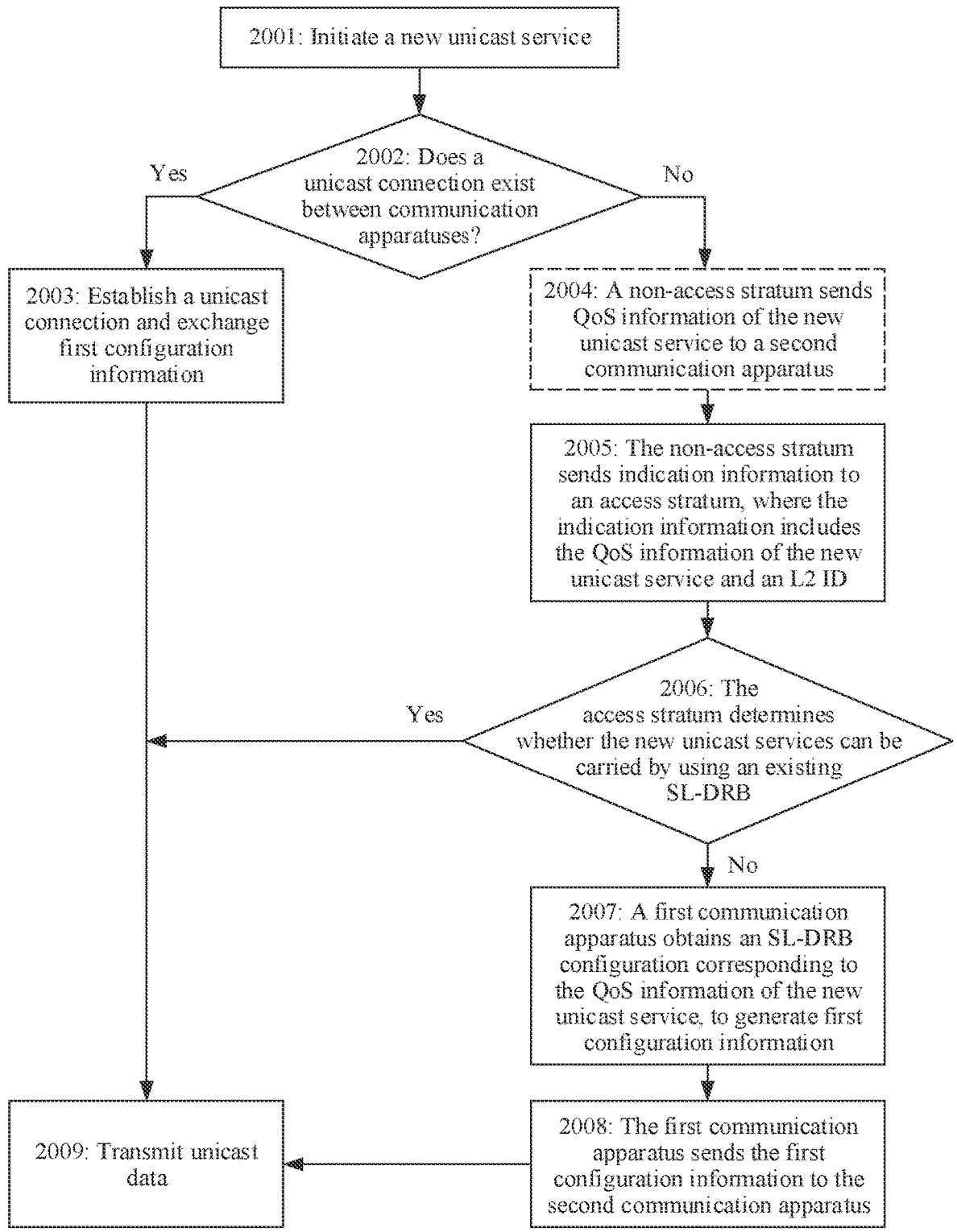
FIG. 11 is a schematic flowchart of a communication method according to an embodiment of this application.

FIG. 11 is a schematic flowchart of a communication method according to an embodiment of this application.

FIG. 11 further details the process of performing unicast communication between the first communication apparatus and the second communication apparatus based on FIG. 10. The method shown in FIG. 11 may be performed by the first communication apparatus. The method shown in FIG. 11 includes steps 2001 to 2008. The following describes the steps in detail.

2001: The first communication apparatus initiates a new unicast service.

2002: The first communication apparatus determines whether a unicast connection exists between the first communication apparatus and the second communication apparatus.

When no unicast connection exists between the first communication apparatus and the second communication apparatus, steps 2003 and 2009 are performed to implement unicast communication. When the unicast connection exists between the first communication apparatus and the second communication apparatus, steps 2004 to 2008 are performed to implement unicast communication between the first communication apparatus and the second communication apparatus by using the existing unicast connection.

2003: Establish a unicast connection and exchange first configuration information between the first communication apparatus and the second communication apparatus.

2004: A non-access stratum of the first communication apparatus sends QoS information of the new unicast service to the second communication apparatus.

In step 2004, the QoS information of the new unicast service is sent to the second communication apparatus, so that the second communication apparatus can determine a service requirement of the new unicast service. After receiving the information, the second communication apparatus may send feedback information to the first communication apparatus, and the feedback information is used to feed back, to the first communication apparatus, whether the second communication apparatus can support the new unicast service initiated by the first communication apparatus (or whether the service requirement of the new unicast service initiated by the first communication apparatus can be satisfied). If the second communication apparatus can support the new unicast service initiated by the first communication apparatus, steps 2005 to 2009 continue to be performed; otherwise, execution of steps 2005 to 2009 are stopped, to stop unicast communication.

2005: The non-access stratum of the first communication apparatus sends indication information to an access stratum of the first communication apparatus, where the indication information includes the QoS information of the new unicast service and a layer 2 ID (L2 ID).

For example, the L2 ID in the indication information in step 2005 is a L2 ID of the second communication apparatus.

2006: The access stratum of the first communication apparatus determines whether the new unicast service can be carried by using an existing SL-DRB.

In step 2006, the access stratum of the first communication apparatus may determine, based on the indication information received from the non-access stratum of the first communication apparatus, whether the new unicast service can be carried by using the existing SL-DRB.

When the new unicast service can be carried by using the existing SL-DRB, step 2009 is performed to transmit unicast data. However, when the existing unicast connection cannot satisfy the service requirement of the new unicast service, the configuration information needs to be updated again for the existing unicast connection, that is, steps 2007 and 2008 are performed.

2007: The first communication apparatus obtains an SL-DRB configuration corresponding to the QoS information of the new unicast service, to generate first configuration information.

For example, the first configuration information includes SL-DRB configuration information corresponding to the QoS information of the new unicast service.

For different types of communication apparatuses, manners of obtaining the SL-DRB configuration information corresponding to the QoS information are different.

For example, a mapping relationship between a VQI and an SL-DRB and a configuration of a corresponding SL-DRB may be preconfigured for a communication apparatus out of coverage (Out-of-coverage) of a base station.

For another example, for a communication apparatus in coverage (in-coverage) of a base station and in an RRC connected mode, the communication apparatus may send a service request message to the base station, the message carries V2X unicast information (such as L2 IDs of the source communication apparatus and a destination communication apparatus and a cast type between the source communication apparatus and the destination communication apparatus) and QoS information. The base station configures a mapping relationship between a VQI and an SL-DRB, and a corresponding SL-DRB configuration for the communication apparatus by using RRC signaling based on the request of the communication apparatus.

For example, for a communication apparatus in coverage (in-coverage) of a base station and in an RRC idle mode, if SIB signaling broadcast by the base station includes a mapping relationship between a VQI and an SL-DRB and a configuration of a corresponding SL-DRB, the configuration broadcast by using the SIB signaling is followed; or if SIB signaling does not include the foregoing configuration, the communication apparatus may enter an RRC connected mode, and send a service request message to the base station, to obtain a mapping relationship between a VQI and an SL-DRB.

After obtaining the mapping relationship between the VQI and the SL-DRB, the communication apparatus may obtain, based on the mapping relationship, the SL-DRB configuration information corresponding to the QoS information of the new unicast service.

2008: The first communication apparatus sends the first configuration information to the second communication apparatus.

It should be understood that the foregoing related limitations and explanations of the first configuration information and establishment of the unicast connection between the first communication apparatus and the second communication apparatus are also applicable to the methods shown in FIG. 10 and FIG. 11.

To ensure security of unicast communication, an identifier for a communication apparatus may be periodically or aperiodically updated, and an updated identifier information is transmitted to a peer device. Therefore, an embodiment of this application further provides another communication method. In the communication method, identifier update information may be exchanged between communication apparatuses, to update an identifier of the communication apparatus. The following describes the communication method with reference to FIG. 12.

Figure 12:
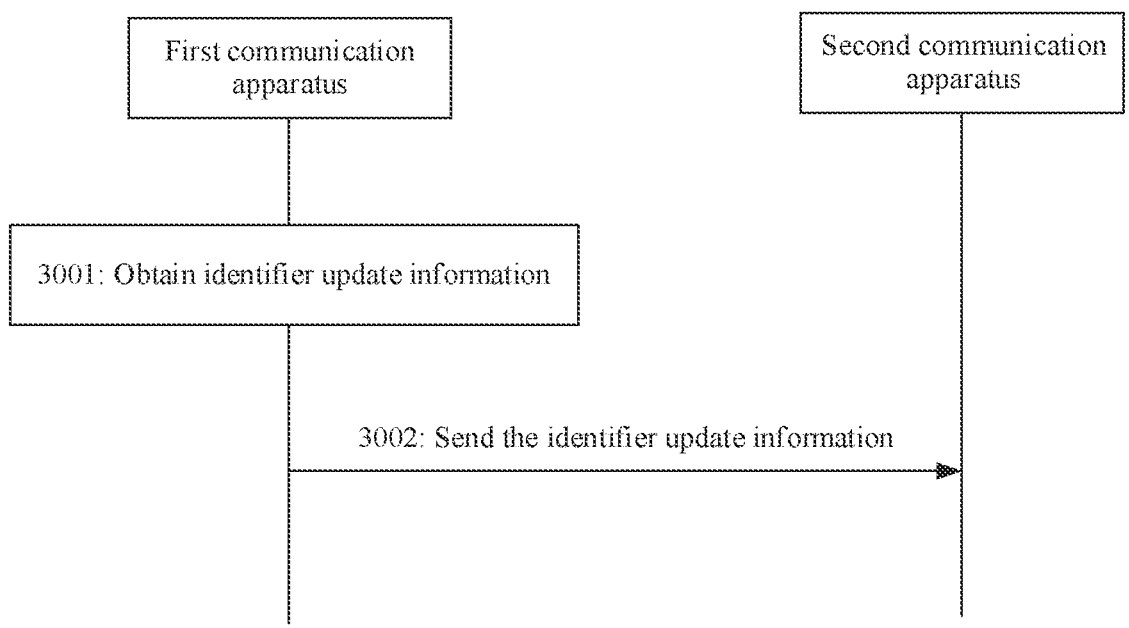
FIG. 12 is a schematic flowchart of a communication method according to an embodiment of this application.

FIG. 12 is a schematic flowchart of a communication method according to an embodiment of this application. The method shown in FIG. 12 may be performed by a first communication apparatus. The method shown in FIG. 12 includes steps 3001 and 3002. The following describes the two steps in detail.

3001: The first communication apparatus obtains identifier update information.

The identifier update information includes updated identifier information of the first communication apparatus 7000.

3002: The first communication apparatus sends the identifier update information to a second communication apparatus through a sidelink.

For example, the sidelink is a radio link between the first communication apparatus and the second communication apparatus to send the identifier update information to the second communication apparatus.

The identifier update information is sent to the second communication apparatus, so that when the first communication apparatus and the second communication apparatus perform unicast communication, corresponding unicast communication service data can be normally transmitted between the first communication apparatus and the second communication apparatus.

Optionally, in an embodiment, the identifier update information further includes identifier information that is of the first communication apparatus and that is not updated.

The identifier information that is of the first communication apparatus and that is not updated is retained in the identifier update information, so that it can be ensured that unicast communication service data transmitted between the first communication apparatus and the second communication apparatus before the identifier update can also be normally transmitted between the first communication apparatus and the second communication apparatus.

Optionally, in an embodiment, the identifier information of the first communication apparatus includes an application layer identifier of the first communication apparatus and/or a source layer 2 identifier of the first communication apparatus.

Figure 13:
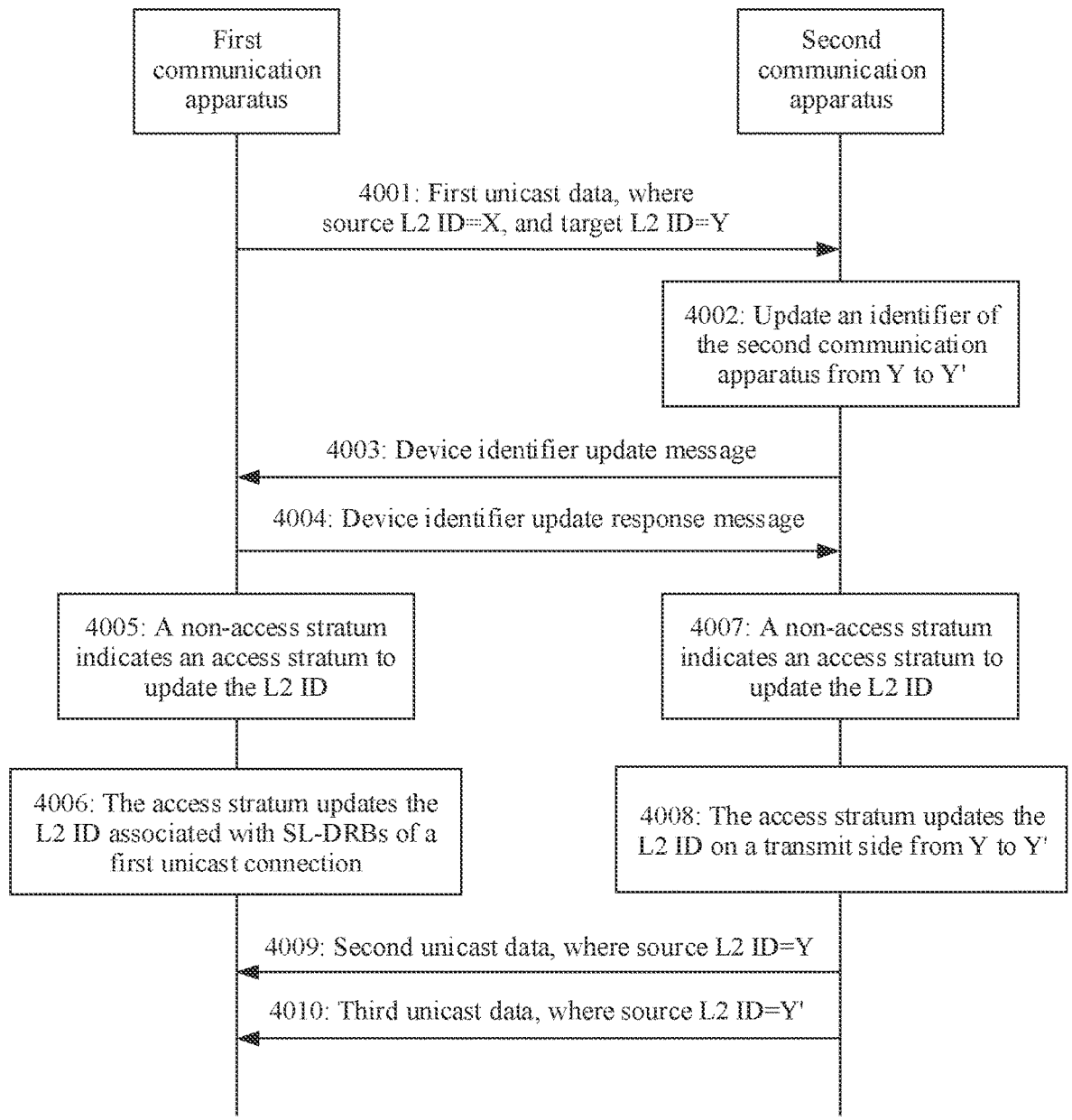
FIG. 13 is a schematic flowchart of a communication method according to an embodiment of this application.

To have a more detailed understanding of a communication process after the device identifier of the communication apparatus is updated, the following describes, with reference to FIG. 13, in detail the unicast communication process after the device identifier is updated.

FIG. 13 is a schematic diagram of a unicast communication process according to an embodiment of this application. FIG. 13 mainly shows a unicast communication process when a device identifier of a communication apparatus is updated. The process shown in FIG. 13 includes steps 4001 to 4010. The following describes the processes in detail.

In FIG. 13, a first unicast connection currently exists between a first communication apparatus and a second communication apparatus, the first unicast connection maintains a group of SL-DRBs, and the first communication apparatus and the second communication apparatus perform unicast communication based on the group of SL-DRBs (the group of SL-DRBs maintained by the first unicast connection). A device ID of the first communication apparatus is X, and a device ID of the second communication apparatus is Y.

For example, for the first communication apparatus, a source L2 ID associated with a transmit side of the SL-DRBs is X (src L2 ID=X), and a destination L2 ID is Y (dest L2 ID=Y). That is, a source L2 ID and a destination L2 ID carried in a data packet sent by the group of SL-DRBs are filled with X and Y respectively. A source L2 ID associated with a receive side of the SL-DRBs is Y (src L2 ID=Y), and a destination L2 ID is X (dest L2 ID=X). That is, the receive side of the SL-DRBs processes only a data packet that carries a source L2 ID and a destination L2 ID that are filled with Y and X respectively.

4001: The first communication apparatus sends first unicast data to the second communication apparatus, where a source L2 ID carried in a data packet of the first unicast data is X, and a destination L2 ID carried in the data packet of the first unicast data is Y.

To improve security of unicast communication between the devices, the device identifier of the device may be updated, that is, step 4002 is performed.

4002: Update the device identifier of the second communication apparatus from Y to Y'.

For example, in step 4002, the second communication apparatus may periodically or aperiodically update the device identifier of the second communication apparatus. For example, the device identifier may include an application layer identifier and/or a non-access stratum identifier and/or the source layer 2 ID.

4003: The second communication apparatus sends a device identifier update message to the first communication apparatus.

For example, the device identifier update message may be a PC5-S message, and the device identifier update message may also be referred to as an L2 ID update request message.

The device identifier update message may include only an updated source L2 ID of the second communication apparatus.

Optionally, the device identifier update message may alternatively include both the source L2 ID of the second device that is not updated and an updated source L2 ID of the second communication apparatus.

4004: The first communication apparatus sends a device identifier update response message to the second communication apparatus.

The device identifier update response message may also be referred to as an L2 ID update response message, and the device identifier update response message is used to indicate that the first communication apparatus has successfully received the device identifier update message.

4005: A non-access stratum of the first communication apparatus indicates an access stratum of the first communication apparatus to update the L2 ID.

Optionally, step 4005 may alternatively not be performed, and step 4006 is directly performed.

4006: The access stratum of the first communication apparatus updates the L2 ID associated with the SL-DRBs of the first unicast connection.

In step 4006, after receiving the update indication from the non-access stratum, the access stratum of the first communication apparatus updates the destination L2 ID associated with the transmit side of the group of SL-DRBs corresponding to the first unicast connection from Y to Y, that is, a destination L2 ID carried in a newly generated MAC PDU of the data packet of the group of SL-DRBs is filled with Y. In this case, the first communication apparatus clears a HARQ receiving process associated with the source L2 ID being Y, and filters out a data packet whose source L2 ID is Y and that has been received at a physical layer; or defines no operation for a HARQ process and a physical layer that are associated with the source L2 ID being Y, and filters out a data packet that is sent from the source L2 ID being Y and that is parsed at a MAC layer.

Alternatively, when a MAC layer of the access stratum delivers the newly generated MAC PDU to a physical layer (PHY), an indicated destination L2 ID is Y (the destination L2 ID in the previously generated MAC PDU has been filled with Y, but data is still retransmitted at the physical layer and continues to be retransmitted without any modification). The receive side of the group of SL-DRBs corresponding to the unicast connection are associated with source L2 IDs Y and Y in a period of time. In this period of time, the first communication apparatus receives data whose source L2 IDs are Y and Y, and delivers, based on a sidelink LCH ID, the data to corresponding SL-DRBs in the group of SL-DRBs for processing.

For example, the access stratum (which may be the MAC layer or an SL-RRC layer) of the first communication apparatus may start a timer. When the timer is running, L2 IDs associated with the receive side of the SL-DRBs are Y and Y. Time duration of the timer may be predefined in a protocol (where the duration of the timer is related to an average time interval t between initial transmission and retransmission of a transport block and a maximum quantity n of times of HARQ retransmission. For example, the time duration of the timer may be defined as t*n); preconfigured; configured by a network by using SIB signaling or RRC dedicated signaling; or directly indicated by using the L2 ID update request message. When the timer is running, the first communication apparatus receives data whose source L2 IDs are Y and Y. After the timer expires, the first communication apparatus receives only data whose source L2 ID is Y.

4007: A non-access stratum of the second communication apparatus indicates an access stratum of the second communication apparatus to update the L2 ID.

For example, in step 4007, the non-access stratum indicates the access stratum to update the source L2 ID.

Optionally, step 4007 may alternatively not be performed, and step 4008 is directly performed.

4008: The access stratum of the second communication apparatus updates the L2 ID associated with the SL-DRBs of the first unicast connection.

The access stratum of the second communication apparatus may update the source L2 ID associated with the transmit side of the group of SL-DRBs corresponding to the first unicast connection from Y to Y, that is, a source L2 ID carried in a newly generated MAC PDU of the data packet of the group of SL-DRBs is filled with Y; or when a MAC layer submits a newly generated MAC PDU to a PHY layer, an indicated source L2 ID is Y (where a source L2 ID in a previously generated MAC PDU has been filled with Y, but the data is still retransmitted at the physical layer and continues to be retransmitted without any modification). In this case, the second communication apparatus clears a HARQ receiving process associated with the destination L2 ID being Y, and filters out a data packet whose destination L2 ID is Y and that has been received at the physical layer; or defines no operation for a HARQ process and a physical layer that are associated with the destination L2 ID being Y, and filters out a data packet that is sent from the destination L2 ID being Y and that is parsed at the MAC layer.

Alternatively, after receiving the update indication sent by the non-access stratum, the access stratum of the second communication apparatus may further update the destination L2 ID associated with the receive side of the group of SL-DRBs corresponding to the first unicast connection to destination L2 IDs Y and Y' (where the destination L2 ID is Y before the update). During this period of time, the second communication apparatus receives data whose source L2 ID is X and destination L2 IDs are Y and Y, and delivers, based on a sidelink LCH ID, the data to corresponding SL-DRBs in the group of SL-DRBs for processing.

For example, the access stratum of the second communication apparatus may start a timer. When the timer is running, after receiving data whose source L2 ID is X and whose destination L2 IDs are Y and Y, the second communication apparatus may deliver, based on the sidelink LCH ID, the data to corresponding SL-DRBs in the group of SL-DRBs for processing. When the timer is running, the second communication apparatus receives data whose source L2 ID is X and whose destination L2 IDs are Y and Y. After the timer expires, the second communication apparatus receives only data whose destination L2 ID is Y'.

4009: The first communication apparatus receives second unicast data sent by the second communication apparatus, where a source L2 ID of the second unicast data is Y.

The second unicast data may be unicast data sent before the second communication apparatus updates the device identifier. Due to a data transmission delay or a data transmission error, after updating the L2 ID associated with the SL-DRBs, the first communication apparatus may receive the unicast data sent by the second communication apparatus before the device identifier is updated.

4010: The first communication apparatus receives third unicast data sent by the second communication apparatus, where a source L2 ID of the third unicast data is Y.

The third unicast data is unicast data obtained after the device identifier of the second communication apparatus is updated. Because the first communication apparatus has updated, based on the device identifier update message, the L2 ID associated with the SL-DRBs, the first communication apparatus may receive the unicast data that is sent by the second communication apparatus and whose source L2 ID is Y'.

Optionally, to further improve security of unicast communication, after updating the L2 ID, the communication apparatus may further update a key of a PDCP layer encryption algorithm, and an updated key (where for example, the key is the source L2 ID in a special case) may be carried in the device identifier update message (the L2 ID update request message) together with the updated source L2 ID.

For example, after receiving PC5-S signaling (carrying the updated L2 ID and key) and before the access stratum uses the updated key, the second communication apparatus may send one or more special PDCP PDUs (which may be referred to as end-marker PDCP PDUs) to the first communication apparatus. The PDCP PDU indicates an SN value, indicating that all PDCP PDUs before the SN are encrypted by using the original key and L2 ID, and a subsequent PDCP PDU is encrypted using the new key and L2 ID. After receiving the special PDCP PDU, a PDCP layer of the first communication apparatus decrypts, by using the L2 ID and the key that are not updated, a PDCP PDU of an SN before the indicated SN, and decrypts, by using the new L2 ID and the new key, a PDCP PDU of a subsequent SN.

Optionally, after receiving the PC5-S signaling indicating to update the key, the second communication apparatus establishes a new group of SL-DRBs that have configurations the same as those of the SL-DRBs maintained by the current unicast connection (where different security algorithms and different keys are used), and initializes the newly established SL-DRBs. The second communication apparatus uses the newly established SL-DRBs to send and receive data of the unicast service.

The foregoing describes in detail the communication method in the embodiments of this application with reference to FIG. 1 to FIG. 13. The following describes communication apparatuses in the embodiments of this application with reference to FIG. 14 to FIG. 18.

Figure 14:
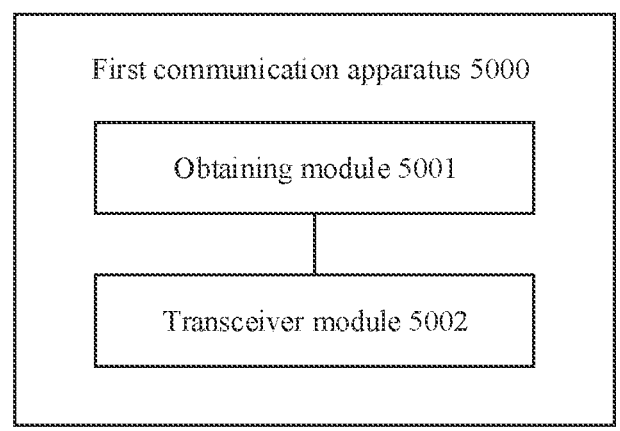
FIG. 14 is a schematic block diagram of a communication apparatus according to an embodiment of this application.

FIG. 14 is a schematic block diagram of a first communication apparatus according to an embodiment of this application. The first communication apparatus 5000 shown in FIG. 14 can perform the steps in the method shown in FIG. 1. When the first communication apparatus 5000 shown in FIG. 14 is described below, repeated descriptions are properly omitted.

The first communication apparatus 5000 includes: an obtaining module 5001, configured to obtain first configuration information, where for example, the first configuration information includes configuration information of a first sidelink radio bearer, the first sidelink radio bearer is used to carry a first unicast service between the first communication apparatus 5000 and a second communication apparatus, and a first sidelink is a radio link between the first communication apparatus 5000 and the second communication apparatus; and a transceiver module 5002, configured to send the first configuration information to the second communication apparatus.

In this application, configuration information of a sidelink radio bearer that carries a unicast service is exchanged between communication apparatuses, so that data of the unicast service can be better transmitted between the communication apparatuses based on the configuration information of the sidelink radio bearer.

Optionally, in an embodiment, when a sidelink radio bearer of an existing unicast connection between the first communication apparatus 5000 and the second communication apparatus does not satisfy a service requirement corresponding to quality of service QoS information of the first unicast service, the transceiver module is configured to send the first configuration information to the second communication apparatus.

Optionally, in an embodiment, the first communication apparatus 5000 further includes: a processing module 5003, configured to: when the processing module 5003 runs, indicate, by a non-access stratum of the first communication apparatus 5000, first information to an access stratum of the first communication apparatus 5000, where the first information includes the QoS information of the first unicast service, or the first information includes the QoS information of the first unicast service and identifier information of the second communication apparatus; and when the processing module 5003 runs, determine, by the access stratum of the first communication apparatus 5000 based on the first information, that the sidelink radio bearer of the existing unicast connection does not satisfy the service requirement corresponding to the QoS information of the first unicast service.

Optionally, in an embodiment, the obtaining module 5001 is configured to:
when the obtaining module 5001 runs, obtain, by the non-access stratum of the first communication apparatus 5000, the first configuration information from the access stratum of the first communication apparatus 5000; and
the transceiver module 5002 is configured to:
when the transceiver module 5002 runs, send, by the non-access stratum of the first communication apparatus 5000, a first request message to a non-access stratum of the second communication apparatus, to establish a first unicast connection between the first communication apparatus 5000 and the second communication apparatus, where for example, the first request message includes the first configuration information, and the first unicast connection is used to transmit the service data of the first unicast service between the first communication apparatus 5000 and the second communication apparatus.

Optionally, in an embodiment, the first communication apparatus 5000 further includes: the processing module 5003 is further configured to: when the processing module 5003 runs, (optionally) indicate any one or more of the following information to the access stratum of the first communication apparatus 5000 before the non-access stratum of the first communication apparatus 5000 obtains the first configuration information from the access stratum of the first communication apparatus 5000: unicast type indication information, identifier information of the first communication apparatus 5000, the identifier information of the second communication apparatus, and the QoS information of the first unicast service.

Optionally, in an embodiment, the first communication apparatus 5000 further includes:
a processing module 5003, configured to: when the processing module 5003 runs, send, by a non-access stratum of the first communication apparatus 5000, a second request message to a non-access stratum of the second communication apparatus, to establish a second unicast connection between the first communication apparatus 5000 and the second communication apparatus, where for example, the second unicast connection is used to transmit the service data of the first unicast service between the first communication apparatus 5000 and the second communication apparatus; and
the transceiver module 5002 is configured to:
when the transceiver module 5002 runs, send, by an access stratum of the first communication apparatus 5000, the first configuration information to an access stratum of the second communication apparatus.

Optionally, in an embodiment, the processing module 5003 is further configured to:
when the processing module 5003 runs, indicate, by the non-access stratum of the first communication apparatus 5000, any one or more of the following information to the access stratum of the first communication apparatus 5000: unicast type indication information, identifier information of the first communication apparatus 5000, identifier information of the second communication apparatus, and QoS information of the first unicast service.

Optionally, in an embodiment, the transceiver module 5002 is further configured to:
send a third request message to a radio access network device, where the third request message includes the QoS information of the first unicast service, or the third request message includes the QoS information of the first unicast service and a unicast connection identifier of the unicast connection corresponding to the first unicast service; and receive the first configuration information sent by the radio access network device.

Optionally, in an embodiment, the identifier information of the first communication apparatus 5000 is updated, and the transceiver module 5002 is further configured to:

send identifier update information to the second communication apparatus, where the identifier update information is used to indicate updated identifier information of the first communication apparatus 5000.

Optionally, in an embodiment, the non-access stratum of the first communication apparatus 5000 is a PC5 signaling layer or an internet of vehicles V2X layer of the first communication apparatus 5000, and the access stratum of the first communication apparatus 5000 is a radio resource control RRC layer or a sidelink radio resource control SL RRC layer of the first communication apparatus 5000.

Figure 15:
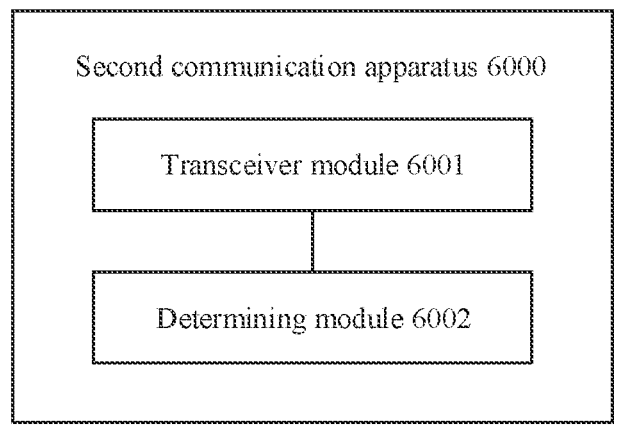
FIG. 15 is a schematic block diagram of a communication apparatus according to an embodiment of this application.

FIG. 15 is a schematic block diagram of a second communication apparatus according to an embodiment of this application.

The second communication apparatus 6000 shown in FIG. 15 can perform the steps in the method shown in FIG. 9. When the communication apparatus 6000 is described below, repeated descriptions are properly omitted.

The second communication apparatus 6000 includes:

a transceiver module 6001, configured to receive first configuration information sent by a first communication apparatus, where for example, the first configuration information includes configuration information of a first sidelink radio bearer, the first sidelink radio bearer is used to carry a first unicast service between the first communication apparatus and the second communication apparatus 6000, and a first sidelink is a radio link between the first communication apparatus and the second communication apparatus 6000; and a determining module 6002, configured to determine the configuration information of the first sidelink radio bearer based on the first configuration information.

Optionally, in an embodiment, the transceiver module 6001 is configured to:

when the transceiver module 6001 runs, receive, by a non-access stratum of the second communication apparatus 6000, a first request message sent by a non-access stratum of the first communication apparatus, to establish a first unicast connection between the first communication apparatus and the target communication apparatus, where for example, the first request message includes the first configuration information, and the first unicast connection is used to transmit service data of the first unicast service between the first communication apparatus and the second communication apparatus 6000.

Optionally, in an embodiment, the transceiver module 6001 is configured to:

when the transceiver module 6001 runs, receive, by a non-access stratum of the second communication apparatus 6000, a second request message sent by a non-access stratum of the first communication apparatus, to establish a second unicast connection between the first communication apparatus and the target communication apparatus, where for example, the second unicast connection is used to transmit service data of the first unicast service between the first communication apparatus and the second communication apparatus 6000; and when the transceiver module 6001 runs, receive, by an access stratum of the second communication apparatus 6000, the first configuration information sent by an access stratum of the first communication apparatus.

Optionally, in an embodiment, the transceiver module 6001 is further configured to: receive identifier update information sent by the first communication apparatus, where the identifier update information is used to indicate updated identifier information of the first communication apparatus.

FIG. 16 is a schematic block diagram of a first communication apparatus according to an embodiment of this application.

The first communication apparatus 7000 shown in FIG. 16 can perform the steps in the method shown in FIG. 12. When the first communication apparatus 7000 shown in FIG. 16 is described below, repeated descriptions are properly omitted.

The first communication apparatus 7000 includes:

an obtaining module 7001, configured to obtain identifier update information, where the identifier update information includes updated identifier information of the first communication apparatus 7000; and a transceiver module 7002, configured to send the identifier update information to a second communication apparatus through a sidelink, where for example, the sidelink is a radio link between the first communication apparatus 7000 and the second communication apparatus.

Optionally, in an embodiment, the identifier update information further includes identifier information that is of the first communication apparatus 7000 and that is not updated.

Optionally, in an embodiment, the identifier information of the first communication apparatus 7000 includes an application layer identifier of the first communication apparatus 7000 and/or a source layer 2 identifier of the first communication apparatus 7000.

FIG. 17 is a schematic block diagram of a communication apparatus according to an embodiment of this application.

The communication apparatus 8000 shown in FIG. 17 includes a transceiver 8001 and a processor 8002. The transceiver is configured to exchange information between the communication apparatus 8000 and another communication apparatus, and the processor 8002 executes program instructions, to perform some or all operations in the communication method in the embodiments of this application. The communication apparatus 8000 may further include a memory (not shown in the figure), and the memory is configured to store necessary program instructions.

Figure 18:
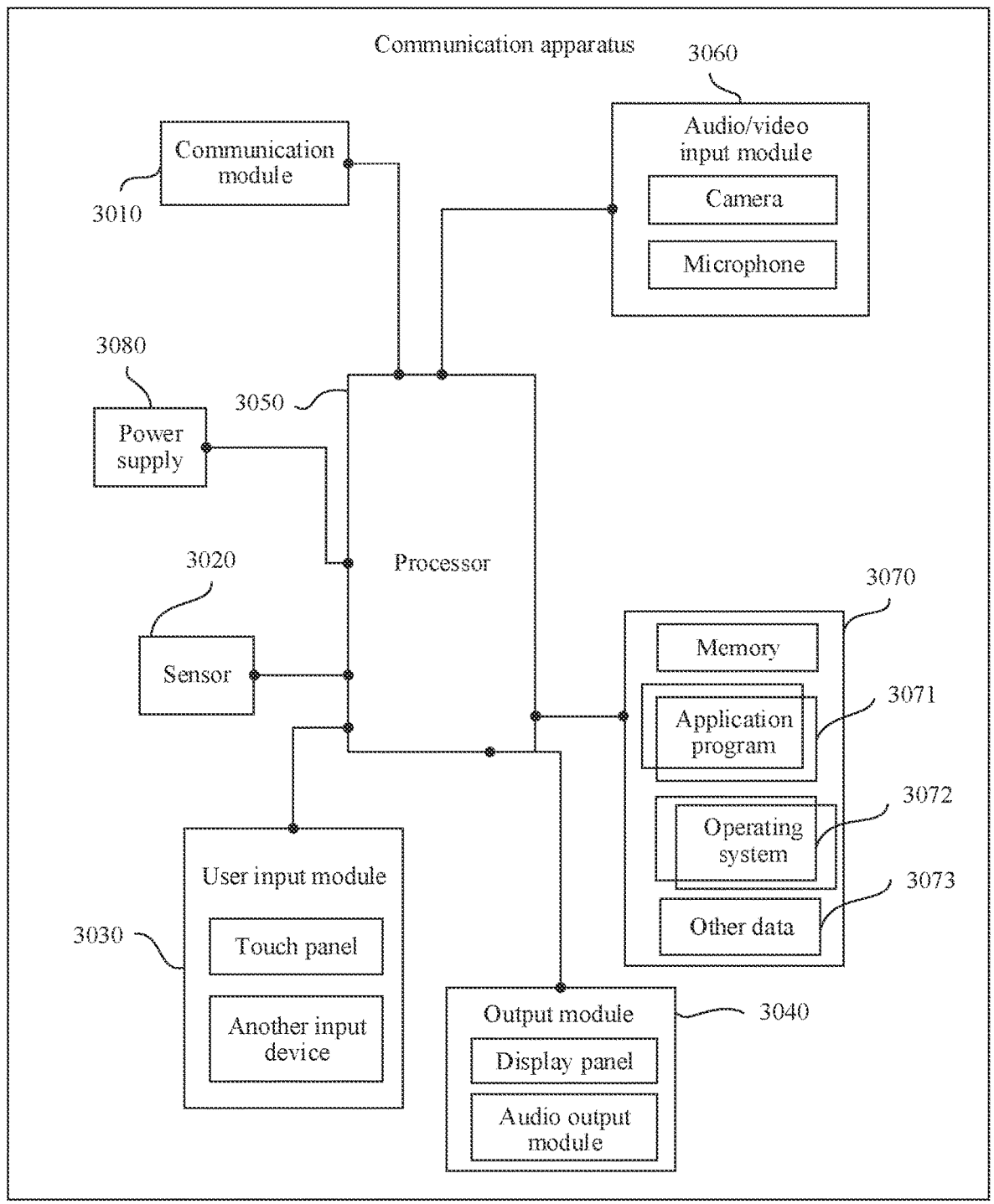
FIG. 18 is a schematic block diagram of a communication apparatus according to an embodiment of this application.

FIG. 18 is a schematic block diagram of a communication apparatus according to an embodiment of this application.

It should be understood that, for specific structures of the first communication apparatus 5000, the second communication apparatus 6000, the first communication apparatus 7000, and the communication apparatus 8000 shown in FIG. 14 to FIG. 16, a structure of the communication apparatus shown in FIG. 18 may alternatively be used.

The communication apparatus in FIG. 18 includes a communication module 3010 and a processor 3050.

The communication module 3010 may be equivalent to the transceiver 8001 in the foregoing descriptions. The communication module 3010 may be configured to exchange information between the communication apparatus shown in FIG. 18 and another communication apparatus.

Optionally, the communication apparatus in FIG. 18 may further include a memory 3070, configured to store necessary program instructions.

Optionally, as shown in FIG. 18, the communication apparatus may further include a sensor 3020, a user input module 3030, an output module 3040, an audio/video input module 3060, a memory 3070, a power supply 3080, and the like.

The communication apparatus shown in FIG. 18 may perform the steps of the communication method in the embodiments of this application. Specifically, the processor 3050 in the communication apparatus shown in FIG. 18 may perform the steps of the communication method in the embodiments of this application. When the processor 3050 executes the program instructions, the processor 3050 may perform the steps of the communication method in the embodiments of this application.

The following describes in detail modules that may be included in the communication apparatus shown in FIG. 18.

The communication module 3010 may include one or more modules that can enable the communication apparatus to communicate with another communication apparatus. For example, the communication module 3010 may include one or more of a wired network interface, a broadcast receiving module, a mobile communication module, a wireless internet module, a local area communication module, and a location (or positioning) information module. A function of the communication module 3010 may be implemented by using a hardware circuit, or may be implemented by using a hardware circuit in combination with computer program instructions.

The processor 3050 may include one or more processors. For example, the processor 3050 may include one or more central processing units, one central processing unit and one graphics processing unit, or one application processor and a coprocessor (for example, a micro control unit or a neural network processor). When the processor 3050 includes a plurality of processors, the plurality of processors may be integrated into a same chip, or may be independent chips. One processor may include one or more physical cores, and the physical core is a minimum processing module.

The memory 3070 stores a computer program. The computer program may include an operating system program 3071, an application program 3072, and/or the like. For example, a typical operating system is a system, such as Windows of Microsoft or MacOS of Apple, used for a desktop computer or a notebook computer; or a system, such as a Linux®-based Android (Android®) system developed by Google, used for a mobile terminal. When the method or operation in the embodiments of this application is implemented by using software, it may be considered that the method or operation is specifically implemented by using the application program 3072.

The memory 3070 may be one or more of the following types: a flash memory, a memory of a hard disk type, a memory of a micro multimedia card type, a card-type memory (for example, an SD or XD memory), a random access memory (RAM), a static random access memory (static RAM, SRAM), a read-only memory (read only memory, ROM), an electrically erasable programmable read-only memory (EEPROM), a programmable read-only memory (programmable ROM, PROM), a magnetic memory, a magnetic disk, or an optical disc. In some other embodiments, the memory 3070 may be a network storage device on the internet. The system may perform an operation such as updating or reading on the memory 3070 on the internet.

The processor 3050 is configured to directly or indirectly execute the computer program in the memory 3070. For example, the processor 3050 executes the operating system program 3071, to run an operating system in the system and implement various functions of the operating system, and/or execute one or more application programs 3072, to run an application to perform the method or operation in the embodiments of this application. For example, the memory 3070 may store a computer program (where the computer program is a program corresponding to the communication method in the embodiments of this application). When the processor 3050 directly or indirectly executes the computer program, the processor 3050 can perform the communication method in the embodiments of this application.

Optionally, the communication apparatus shown in FIG. 18 may further include the sensor 3020, the user input module 3030, the output module 3040, the audio/video input module 3060, the power supply 3080, and the like. The following briefly describes the modules or units.

The sensor 3020 may sense some operations of a user, and the sensor 3020 may include a distance sensor, a touch sensor, and the like. The sensor 3020 may sense an operation such as touching a screen or approaching a screen by the user.

The user input module 3030 is configured to: receive input digit information, character information, or a contact touch operation/contactless gesture; and receive signal input related to user setting and function control of the system. The user input module 3030 includes a touch panel and/or another input device.

The output module 3040 includes a display panel, configured to display information entered by the user, information provided for the user, various menu interfaces of the system, and the like. Optionally, the display panel may be configured in a form of a liquid crystal display (LCD), an organic light-emitting diode (OLED), or the like. In some other embodiments, the touch panel may cover the display panel, to form a touch display screen. Optionally, the output module 3040 may further include an audio output module, an alarm, a tactile module, and the like.

The audio/video input module 3060 is configured to input an audio signal or a video signal. The audio/video input module 3060 may include a camera and a microphone.

The power supply 3080 may receive external power and internal power under control of the processor 3050, and provide power required for running the modules in the entire communication apparatus.

A connection relationship between the modules in FIG. 18 is merely an example. The modules in the communication apparatus shown in FIG. 18 may alternatively be connected in another connection manner. For example, some or all of the modules in the communication apparatus shown in FIG. 18 are connected through a bus.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for a purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
    obtaining, by a first communication apparatus, first configuration information of a first sidelink radio bearer of a first sidelink, the first sidelink radio bearer is used to carry a first unicast service between the first communication apparatus and a second communication apparatus, and the first sidelink is a radio link between the first communication apparatus and the second communication apparatus; and
    sending, by the first communication apparatus, the first configuration information to the second communication apparatus.

2. The method according to claim 1, wherein the first communication apparatus sends the first configuration information to the second communication apparatus when a sidelink radio bearer of an existing unicast connection between the first communication apparatus and the second communication apparatus does not satisfy a service requirement corresponding to quality of service (QoS) information of the first unicast service.

3. The method according to claim 1, wherein the method further comprises:
    sending, by the first communication apparatus, a request message to a radio access network device, wherein the request message comprises QoS information of the first unicast service, or the request message comprises the QoS information of the first unicast service and a unicast connection identifier of a unicast connection corresponding to the first unicast service; and
    wherein obtaining the first configuration information comprises:
        receiving, by the first communication apparatus, the first configuration information sent by the radio access network device after sending the request message.

4. A communication method comprising:
    receiving, by a second communication apparatus, first configuration information sent by a first communication apparatus, wherein the first configuration information comprises configuration information of a first sidelink radio bearer of a first sidelink, the first sidelink radio bearer is used to carry a first unicast service between the first communication apparatus and the second communication apparatus, and the first sidelink is a radio link between the first communication apparatus and the second communication apparatus; and
    determining, by the second communication apparatus, the configuration information of the first sidelink radio bearer based on the first configuration information.

5. The method according to claim 4, wherein the receiving, by the second communication apparatus, the first configuration information sent by the first communication apparatus comprises:
    receiving, by a non-access stratum of the second communication apparatus, a request message sent by a non-access stratum of the first communication apparatus, the request message requesting to establish a first unicast connection between the first communication apparatus and the second communication apparatus, wherein the request message comprises the first configuration information, and the first unicast connection is used to transmit service data of the first unicast service between the first communication apparatus and the second communication apparatus.

6. A first communication apparatus comprising:
    at least one processor, and a non-transitory memory storing instructions for execution by the at least one processor;
    wherein, when executed, the instructions cause the first communication apparatus to perform operations comprising:
    obtaining first configuration information of a first sidelink radio bearer of a first sidelink, the first sidelink radio bearer is used to carry a first unicast service between the first communication apparatus and a second communication apparatus, and the first sidelink is a radio link between the first communication apparatus and the second communication apparatus; and
    sending the first configuration information to the second communication apparatus.

7. The first communication apparatus according to claim 6, wherein the first configuration information is sent to the second communication apparatus when a sidelink radio bearer of an existing unicast connection between the first communication apparatus and the second communication apparatus does not satisfy a service requirement corresponding to quality of service (QoS) information of the first unicast service.

8. The first communication apparatus according to claim 6, wherein the operations further comprises:
  sending a request message to a radio access network device, wherein the request message comprises QoS information of the first unicast service, or the request message comprises the QoS information of the first unicast service and a unicast connection identifier of a unicast connection corresponding to the first unicast service; and
  wherein obtaining the first configuration information comprises:
    receiving the first configuration information sent by the radio access network device.

9. A second communication apparatus comprising:
at least one processor, and a memory storing instructions for execution by the at least one processor;
wherein, when executed, the instructions cause the second communication apparatus to perform operations comprising:
  receiving first configuration information sent by a first communication apparatus, wherein the first configuration information comprises configuration information of a first sidelink radio bearer of a first sidelink, the first sidelink radio bearer is used to carry a first unicast service between the first communication apparatus and the second communication apparatus, and the first sidelink is a radio link between the first communication apparatus and the second communication apparatus; and
  determining the configuration information of the first sidelink radio bearer based on the first configuration information.

10. The second communication apparatus according to claim 9, wherein the receiving the first configuration information sent by the first communication apparatus comprises:
  receiving, by a non-access stratum of the second communication apparatus, a request message sent by a non-access stratum of the first communication apparatus, the request message requesting to establish a first unicast connection between the first communication apparatus and the second communication apparatus, wherein the request message comprises the first configuration information, and the first unicast connection is used to transmit service data of the first unicast service between the first communication apparatus and the second communication apparatus.

* * * * *